United States Patent [19]
Kotani et al.

[11] Patent Number: 5,670,236
[45] Date of Patent: Sep. 23, 1997

[54] BIAXIALLY ORIENTED POLYESTER FILM FOR MAGNETIC RECORDING MEDIUM

[75] Inventors: Tomoyuki Kotani, Chigasaki; Kazuo Endo, Yokohama; Seiji Sakamoto, Machida; Takashi Harada; Narihiro Masuda, both of Yokohama; Masashi Inagaki, Tsukui-gun; Chikakazu Kawaguchi, Nagahama, all of Japan

[73] Assignee: Diafoil Hoechst Company, Ltd., Tokyo, Japan

[21] Appl. No.: 482,791

[22] Filed: Jun. 7, 1995

Related U.S. Application Data

[63] Continuation of Ser. No. 127,566, Sep. 28, 1993, abandoned.

[30] Foreign Application Priority Data

| Sep. 29, 1992 | [JP] | Japan | 4-260316 |
| Oct. 13, 1992 | [JP] | Japan | 4-274573 |
| Dec. 3, 1992 | [JP] | Japan | 4-324184 |

[51] Int. Cl.$^6$ ............ B32B 27/36; B32B 27/06; B32B 5/16; B32B 7/00
[52] U.S. Cl. ............ 428/141; 428/213; 428/329; 428/330; 428/338; 428/339; 428/403; 428/480; 428/694; 428/56 SG; 428/910
[58] Field of Search ............ 428/141, 148, 428/143, 328, 329, 323, 330, 331, 480, 910, 694 ST, 694.56 SG, 694 SL

[56] References Cited

U.S. PATENT DOCUMENTS

| 4,461,797 | 7/1984 | Adachi et al. | 428/147 |
| 4,680,217 | 7/1987 | Kanesaki et al. | 428/141 |
| 5,006,589 | 4/1991 | Sakamoto et al. | 524/430 |
| 5,069,962 | 12/1991 | Okazaki et al. | 428/323 |
| 5,164,439 | 11/1992 | Sakamoto et al. | 524/425 |
| 5,188,891 | 2/1993 | Takeda et al. | 428/323 |
| 5,196,472 | 3/1993 | Kimura et al. | 524/425 |
| 5,252,388 | 10/1993 | Murooka et al. | 428/328 |
| 5,279,881 | 1/1994 | Kotani | 428/141 |

FOREIGN PATENT DOCUMENTS

| 0 460 640 A1 | 12/1991 | European Pat. Off. |
| 0 490 665 A1 | 6/1992 | European Pat. Off. |
| 59-69426 | 4/1984 | Japan |
| 59-217755 | 12/1984 | Japan |
| 62-207356 | 9/1987 | Japan |
| 1-256558 | 10/1989 | Japan |
| 1-306220 | 12/1989 | Japan |

*Primary Examiner*—Paul J. Thibodeau
*Assistant Examiner*—Vivian Chen
*Attorney, Agent, or Firm*—Foley & Lardner

[57] ABSTRACT

A biaxially oriented polyester film for a magnetic recording medium contains: 1) at least two different sizes of synthetic calcium carbonate particles; and 2) aluminum oxide particles to produce a film with excellent surface uniformity, running properties, and slittability wherein the film generates few scratches and low amounts of abrasion dust. The synthetic calcium carbonate particles are surface treated with a polycarboxylic acid, followed by treatment with a phosphorus compound. The biaxially oriented polyester film can comprise a layer in a multilayer film.

14 Claims, No Drawings

BIAXIALLY ORIENTED POLYESTER FILM FOR MAGNETIC RECORDING MEDIUM

This application is a continuation of application Ser. No. 08/127,566, filed Sep. 28, 1993, now abandoned.

BACKGROUND OF THE INVENTION

The present invention relates to a biaxially oriented polyester film for a magnetic recording medium.

Biaxially oriented polyester films are widely used as a material in the industrial fields. With the recent demand for higher-grade polyester films, especially, for a magnetic recording medium, the polyester films are strongly required to have uniform surfaces. The improvement of the wear characteristic of films, which are represented by a scraped surface layer due to the wear of a film or drop-off of the particles from the surface, and the amelioration of the wriggling running of a magnetic tape when such polyester films are used as base films of magnetic tapes, are now strongly demanded. When a polyester film is used as a base film for a high-grade video tape, a back coat is conventionally applied to the base film. However, what is called a non-back-coat type base film for a high-grade video tape is required in order to reduce the cost. Polyester films for a magnetic recording medium are required to fully satisfy these demands.

As a means for improving the abrasion resistance and the running property of a polyester film, a method of making the film surface appropriately rough by mixing inert fine particles with the film is conventionally known. By this method, these properties are improved to some extent but cannot always be said to be satisfactory.

For example, when precipitated particles which are produced from the residue of a catalyst after the production of a polyester are used as the fine particles, the fine particles are easily broken when the film is stretched, so that the abrasion resistance and the running property of the film are insufficient and as a result, it is difficult to reuse the precipitated particles.

When inorganic compound particles which are inert to polyesters such as silicon oxide, barium sulfate, titanium dioxide and calcium phosphate are added to a polyester film, these particles are not broken or deformed when the film is stretched, and provide comparatively sharp protuberances for the film surface, thereby improving the running property of the film. However, since the particle size distribution of these particles is generally wide and the particles easily drop off the film surface when the film is used for a video tape, the deterioration of an electromagnetic conversion property (signal recording property) and a large number of dropouts are often caused.

To solve these problems, a method of using inorganic or organic particles having a sharp particle size distribution has been proposed. For example, Japanese Patent Application Laid-Open (KOKAI) No. 62-207356 (1987) discloses a method of using monodisperse silicon oxide particles, and Japanese Patent Application Laid-Open (KOKAI) No. 59-217755 (1984) discloses a method of using organic crosslinking particles by emulsion polymerization. In the case of using silicon oxide particles, however, since the hardness of the particles is high, the film is apt to damage the base material which is in contact with the polyester film, and the improvement of the abrasion resistance is insufficient. On the other hand, in the case of using organic crosslinking particles, not only is the heat resistance insufficient but also the particles are easily deformed when the film is stretched.

Especially in a non-back-coat type base film for a high-grade video tape, since an excellent running property is required, it is necessary to mix the particles in a large amount, so that method is disadvantageous in the point of cost.

As a means for solving the problem in the abrasion resistance, a method of adding particles having a high Mohs hardness such as aluminum oxide particles to a base film has been proposed, e.g., Japanese Patent Application Laid-Open (KOKAI) No. 1-306220 (1989). In this method, however, it is necessary to add a large amount of aluminum oxide particles to a base film in order to sufficiently prevent the production of scratches or abrasion dust on the magnetic tape, which give rise to the following problems.

(1) Since aluminum oxide particles are comparatively expensive.

(2) In the film formation process, the cutting blade is so greatly damaged at the slitting step thereof that frequent change of cutting blades is necessary, thereby increasing the manufacturing cost and reducing the productivity. If the cutting blades are not changed frequently at the slitting step, the cutting property of the film is deteriorated, so that the slit surface is sometimes turned up in the streak-like shape, and fines and abrasion dust drop off the slit surface at the slitting step. If such a film is used for a magnetic recording medium, the signal recording property is deteriorated and dropouts are induced.

(3) In the production of a magnetic tape, the cutting blade is so greatly damaged at the slitting step thereof that frequent change of cutting blades is necessary, thereby increasing the manufacturing cost and reducing the productivity. If the cutting blades are not changed frequently at the slitting step, the cutting property of the magnetic tape is deteriorated, so that the slit surface is sometimes turned up in the streak-like shape, and fines and abrasion dust drop off the slit surface at the slitting step. If such a phenomenon is generated, white powder adheres to the tape, thereby deteriorating the signal recording property and inducing dropouts.

As described above, it can not to provide in industrial production a polyester film which simultaneously satisfies the surface uniformity, the running property, the wriggling running resistance and the abrasion resistance at a high level.

Accordingly, a polyester film which has an excellent surface uniformity, which produces only a small number of scratches and only a small amount of abrasion dust, which has an excellent running property without wriggling running when it is manufactured into a magnetic tape, which is improved in the slittability, and which is improved in the production cost is strongly demanded.

As a result of various studies undertaken by the present inventors so as to solve the above-described problems, it has been found that a biaxially oriented polyester film obtained by adding to a polyester film 0.15 to 1.0 wt % of aluminum oxide particles having an average particle diameter of 0.005 to 0.5 μm and 0.35 to 1.00 wt % of synthetic calcium carbonate particles having an average particle diameter of 0.25 to 0.75 μm so that the sum of the average particle diameter of the synthetic calcium carbonate particles and half the content of the synthetic calcium carbonate particles is in the range of 0.50 to 0.95, so as to adjust an average center line roughness of the surface of the polyester film to 0.09 to 0.020 μm, an average surface roughness at 10 points of the polyester film to 7.0 to 15 μm and the ratio of a dynamic friction coefficient of the polyester film at the fiftieth running to a dynamic friction coefficient of the polyester film at the first running when the polyester film is run repeatedly, of 0.80 to 1.6, is excellent in a surface uniformity, running property and abrasion resistance. On the basis of this finding, the present invention has been achieved.

SUMMARY OF THE INVENTION

It is an object of the present invention to provide a biaxially oriented polyester film for a magnetic recording medium which has an excellent surface uniformity, which generates only a small number of scratches and only a small amount of abrasion dust, and which has an excellent running property without wriggling running when it is manufactured into a magnetic tape, and which has improved slittability.

To achieve this aim, in a first aspect of the present invention, there is provided a biaxially oriented polyester film for a magnetic recording medium, the polyester film containing synthetic calcium carbonate particles which satisfy the following formulas (1) to (4):

$$0.25 \leq d_a \leq 0.75 \quad (1)$$

$$0.35 \leq W_a^A \leq 1.00 \quad (2)$$

$$0.5 \leq d_a + 0.5 W_a^A \leq 0.95 \quad (3)$$

$$0.8 d_a - W_a^A \geq 1.50 \quad (4)$$

wherein $d_a$ represents an average particle diameter (μm) of the synthetic calcium carbonate particles in the polyester film, and $W_a^A$ represents the content (wt %) of the synthetic calcium carbonate particles in the polyester film, and aluminum oxide particles which satisfy the following formulas (5) and (6):

$$0.005 \leq d_b \leq 0.50 \quad (5)$$

$$0.15 \leq W_b^A \leq 1.00 \quad (6)$$

wherein $d_b$ represents an average particle diameter (μm) of the aluminum oxide particles in the polyester film, and $W_b^A$ represents the content (wt %) of the aluminum oxide particles in the polyester film, the polyester film having simultaneously properties represented by the following formulas (7) to (9):

$$0.009 \leq Ra^A \leq 0.020 \quad (7)$$

$$7.0 \leq Rz^A/Ra^A \leq 15 \quad (8)$$

$$0.80 \leq \mu d^{50^A}/\mu d^{1^A} \leq 1.6 \quad (9)$$

wherein $Ra^A$ and $Rz^A$ represent an average center line roughness (μm) of the exposed surface of the polyester film and a surface roughness (μm) at 10 points on the exposed surface of the polyester film, respectively, and $\mu d^{50^A}/\mu d^{1^A}$ represents the ratio of a dynamic friction coefficients of the exposed surface of the polyester film at the fiftieth running to a dynamic friction coefficients of the exposed surface of the polyester film at the first running when the polyester film is run repeatedly.

In a second aspect of the present invention, there is provided a biaxially oriented polyester film for a magnetic recording medium comprising a polyester layer (A) and a polyester layer (B) which are laminated by co-extrusion, wherein the following formulas are simultaneously satisfied:

$$0.30 \leq d_a \leq 0.65 \quad (1')$$

$$0.35 \leq W_a^A \leq 1.00 \quad (2)$$

$$0.55 \leq d_a + 0.5 W_a^A \leq 0.95 \quad (3')$$

$$8 d_a - W_a^A \geq 1.50 \quad (4)$$

$$0.005 \leq d_b \leq 0.50 \quad (5)$$

$$0.15 \leq W_b^A \leq 1.00 \quad (6)$$

$$0.009 \leq Ra^A \leq 0.020 \quad (7)$$

$$7.0 \leq Rz^A/Ra^A \leq 15 \quad (8)$$

$$0.80 \leq \mu d^{50^A}/\mu d^{1^A} \leq 1.6 \quad (9)$$

$$W_b \leq 0.10 \quad (10)$$

$$0.002 \leq Ra^B \leq 0.017 \quad (11)$$

wherein $d_a$ represents an average particle diameter (μm) of the synthetic calcium carbonate particles in the polyester film, $W_a^A$ represents the content (wt %) of the synthetic calcium carbonate particles in the polyester film, $d_b$ represents an average particle diameter (μm) of the aluminum oxide particles in the polyester film, and $W_b^A$ represents the content (wt %) of the aluminum oxide particles in the polyester film, $Ra^A$ and $Rz^A$ represent an average center line roughness (μm) of the exposed surface of the polyester film and a surface roughness (μm) at 10 points on the exposed surface of the polyester film, respectively, and $\mu d^{50^A}/\mu d^{1^A}$ represents the ratio of a dynamic friction coefficients of the exposed surface of the polyester film at the fiftieth running to a dynamic friction coefficients of the exposed surface of the polyester film at the first running when the polyester film is run repeatedly, $W_b$ represents the content (wt %) of the aluminum oxide particles in the polyester film as a whole, and $Ra^B$ represents an average center line roughness (μm) of the exposed surface of the polyester (B).

In a third aspect of the present invention, there is provided a biaxially oriented polyester film for a magnetic recording medium, the polyester film containing 0.35 to 1.0 wt % of particles having an average particle diameter of 0.25 to 0.75 μm and produced by surface-treating synthetic calcium carbonate particles with a high-molecular polycarboxylic acid, and treating the resultant synthetic calcium carbonate particles with a phosphorus compound represented by the following general formula (12):

wherein R represents a hydrocarbon group having 1 to 10 carbon atoms, l is 1 or 2, m is 1 or 2, n is 1 or 2, and the sum of l and m is 3.

In a fourth aspect of the present invention, there is provided a biaxially oriented polyester film for a magnetic recording medium, the polyester film containing 0.15 to 1.0 wt % of aluminum oxide particles having an average particle diameter of 0.005 to 0.5 μm; and synthetic calcium carbonate particles having simultaneously properties represented by the following formulas:

$$0.25 \leq d_a \leq 0.50 \quad (1'')$$

$$0.35 \leq W_a^A \leq 1.00 \quad (2)$$

$$0.50 \leq d_a + 0.5 W_a^A \leq 0.85 \quad (3'')$$

$$8 d_a - W_a^A 24\ 1.50 \quad (4)$$

wherein $d_a$ represents an average particle diameter (μm) of the synthetic calcium carbonate particles in the polyester film, and $W_a^A$ represents the content (wt %) of the synthetic calcium carbonate particles in the polyester film, and the polyester film having simultaneously properties represented by the following formulas (7) to (9):

$$0.009 \leq Ra^A \leq 0.020 \quad (7)$$

$$7.0 \leq Rz^A/Ra^A \leq 15 \quad (8)$$

$$0.80 \leq \mu d^{50^A}/\mu d^{1^A} \leq 1.6 \quad (9)$$

wherein $Ra^A$ and $Rz^A$ represent an average center line roughness (μm) of the exposed surface of the polyester film and a surface roughness (μm) at 10 points on the exposed surface of the polyester film, respectively, and $\mu d^{50^A}/\mu d^{1^A}$ represents the ratio of a dynamic friction coefficients of the exposed surface of the polyester film at the fiftieth running to a dynamic friction coefficients of the exposed surface of the polyester film at the first running when the polyester film is run repeatedly.

DETAILED DESCRIPTION OF THE INVENTION

The "polyester" in the present invention means a polyester which is obtained from an aromatic dicarboxylic acid or an ester thereof and a glycol as the main starting materials, or which has not less than 80% of ethylene terephthalate units or ethylene-2,6-naphthalate units as repeating structural units thereof. More preferably, the polyester has not less than 80% of ethylene terephthalate units as repeating structural units thereof.

As the aromatic dicarboxylic acid component, isophthalic acid, phthalic acid, adipic acid, sebacic acid and an oxycarboxylic acid (e.g., p-oxyethoxybenzoic) other than terephthalic acid and 2,6-naphthalene dicarboxylic acid can be used. As the glycol component, at least one of diethylene glycol, propylene glycol, butanediol, 1,4-cyclohexanedimethanol and neopentyl glycol other than ethylene glycol can be used.

The polyester film of the present invention contains a specific amount of specified synthetic calcium carbonate particles and aluminum oxide particles.

The calcium carbonate particles used in the present invention will first be explained.

As a method of producing calcium carbonate particles, a method of pulverizing and classifying natural calcium carbonate, and a method of synthesizing precipitated calcium carbonate particles by injecting carbon dioxide-containing gas into a calcium hydroxide solution are conventionally known. In this case, calcite-type calcium carbonate particles having a comparatively uniform particle diameter are obtained. On the other hand, it is difficult to obtain natural calcium carbonate particles having the desired particle size distribution and as a result, it is impossible to produce a film having various properties at a high level. Accordingly, synthetic calcium carbonate particles are used in the present invention, and especially, synthetic calcium carbonate particles having a uniform particle size distribution are preferably used.

The particle size distribution of the synthetic calcium carbonate particles used in the present invention is not more than 1.80, preferably not more than 1.70, more preferably not more than 1.60. If the particle size distribution exceeds 1.80, the surface roughness of the film finally obtained becomes nonuniform, whereby the signal recording property of a magnetic recording medium may be impaired, and the withstand voltage may be deteriorate. As the crystal forms of the synthetic calcium carbonate particles, calcite-type, vaterite-type and argonite-type forms are known. Among these, calcite-type calcium carbonate particles are preferable, because they are not only industrially easily available and advantageous in the cost but also they can produce a polyester which has a high anti-aggregative thermal stability (thermal stability high enough to prevent aggregation).

Synthetic calcium carbonate particles can be added in the process of producing a polyester as they are. However, in order to reduce the solubility of the particles in the reaction system, and enhance the dispersibility and the high anti-aggregative thermal stability, which is an important property in the present invention, it is preferable to subject the synthetic calcium carbonate particle to surface-treatment before adding them to the reaction system. As the surface-treating agent which also serves as a dispersant, the surface-treating agents which are described in Japanese Patent Application Laid-Open (KOKAI) Nos. 59-69426 (1984) and 1-256558 (1989), for example, polycarboxylic acids or sodium salts, ammonium salts thereof are preferably used. Copolymers composed of polyalkylene glycol units, polyacrylic acid units and/or polyacrylic acid derivative units are more preferable. Examples of such copolymers are a copolymer of a polyacrylic acid and polyethylene glycol monomethacrylate, a copolymer of a polyacrylic acid, methoxypolyethylene glycol and polyethylene glycol monomethacrylate, and copolymers which has a polyacrylic acid neutralized with ammonia or substituted by sodium polyacrylate. These surface-treating agents are generally effective when they are added in the process of producing the synthetic calcium carbonate particles.

One of the important features of the present invention lies in that a specific amount of synthetic calcium carbonate particles having a specific average particle diameter are added to a polyester film. In the present invention, it is necessary that an average particle diameter ($d_a$) of the synthetic calcium carbonate particles in the polyester film and the content ($W_a^A$) of the synthetic calcium carbonate particles simultaneously satisfy the following formulas (1) to (4):

$$0.25 \leq d_a \leq 0.75 \quad (1)$$

$$0.35 \leq W_a^A \leq 1.00 \quad (2)$$

$$0.5 \leq d_a + 0.5 W_a^A \leq 0.95 \quad (3)$$

$$8d_a - W_a^A \geq 1.50 \quad (4)$$

wherein $d_a$ represents an average particle diameter (μm) of the synthetic calcium carbonate particles in the polyester film, and $W_a^A$ represents the content (wt %) of the synthetic calcium carbonate particles in the polyester film.

It is necessary in the present invention that an average particle diameter ($d_a$) of the synthetic calcium carbonate particles in the polyester film is 0.25 to 0.75 μm. If the $d_a$ is less than 0.25 μm, the running property and the abrasion resistance are hardly improved and the anti-aggregative thermal stability of the polyester is too low. On the other hand, if the $d_a$ exceeds 0.75 μm, the surface roughness of the polyester film is so large that not only is the signal recording property deteriorated due to back-side transfer or the like but also the wriggling run of the polyester film is likely to be caused especially when the polyester film is used as a base film for a non-back-coat type high-grade video tape. The $d_a$ is preferably in the range of 0.27 to 0.70 μm, more preferably 0.31 to 0.60 μm, even more preferably 0.38 to 0.50 μm.

In the polyester film of the present invention, it is necessary that the content ($W_a^A$) of the synthetic calcium carbonate particles is 0.35 to 1.00 wt %. If the $W_a^A$ is less than 0.35 wt %, it is difficult to produce a polyester film suitable for a magnetic recording medium, especially, for a non-back-coat type high-grade video tape which satisfies the surface uniformity, the running property, the wriggling running resistance and the abrasion resistance at a high level. On the other hand, if the $W_a^A$ exceeds 1.00 wt %, the surface roughness thereof is so large that the signal recording property is deteriorated. The $W_a^A$ is preferably in the range of 0.45 to 0.90 wt %.

It is sometimes difficult to produce a polyester film suitable for a high-quality magnetic recording medium, especially, for a non-back-coat type high-grade video tape, which is aimed at in the present invention, even if an average particle diameter ($d_a$) and the content ($W_a^A$) of the synthetic calcium carbonate particles added satisfy the above-described definitions. As a result of studies undertaken by the present inventors, it has been found that if the average particle diameter ($d_a$) and the content ($W_a^A$) of the synthetic calcium carbonate particles simultaneously satisfy the formulas (3) and (4), it is possible to produce a polyester film suitable for a high-quality magnetic recording medium, especially, for a non-back-coat type high-grade video tape which is aimed at in the present invention.

Namely, in the present invention, it is necessary that the ($d_a$+0.5$W_a^A$) is in the range of 0.50 to 0.95. If the ($d_a$+0.5$W_a^A$) is less than 0.50, the running property of the polyester film is deteriorated and the wriggling running of the polyester film is likely to be caused. In addition, the abrasion resistance of the polyester film is lowered. On the other hand, if the ($d_a$+0.5$W_a^A$) exceeds 0.95, the surface roughness of the polyester film is so large that the signal recording property is deteriorated. The ($d_a$+0.5$W_a^A$) is preferably in the range of 0.55 to 0.90, more preferably 0.55 to 0.85, still more preferably 0.60 to 0.80, most preferably 0.62 to 0.75.

In the polyester film of the present invention, the ($8d_a$−$W_a^A$) is not less than 1.50, preferably 1.80, more preferably 2.00. If the ($8d_a$−$W_a^A$) is less than 1.50, the synthetic calcium carbonate particles in polyester film aggregate frequently, thereby producing coarse protuberances.

As described above, it is necessary in the present invention to add a large amount of synthetic calcium carbonate particles having a comparatively small particle diameter. The synthetic calcium carbonate particles in such polyester material may aggregate so that the product is sometimes what is called a defective. In the case where the degree of aggregation is large, coarse protuberances are produced in the polyester film, which cause dropouts or deteriorate the signal recording property when such film is used for a magnetic recording medium such as a video tape.

Such an aggregation phenomenon has a close relationship with a change in the particle diameters due to heat-treatment. It has been found that if a polyester having a high anti-aggregative thermal stability is used in the production of a polyester material, the frequency of causing aggregation is low, so that it is possible to produce a high-quality polyester film with stability.

In the synthetic calcium carbonate particles in the polyester material, the ratio ($d_a$/$d_a'$) of an average particle diameter ($d_a$) to an average particle diameter ($d_a'$) after heat-treatment is preferably not less than 0.60, more preferably not less than 0.65, most preferably not less than 0.70. The $d_a$ represents an average particle diameter (μm) of the synthetic calcium carbonate particles in the polyester before heat-treatment which is measured by SEM, and the $d_a'$ represents an average particle diameter (μm) of the synthetic calcium carbonate particles in the polyester after heat-treatment at a temperature of 280° C. for 8 hours in the atmosphere of nitrogen. If the ratio ($d_a$/$d_a'$) is less than 0.60, the synthetic calcium carbonate particles in the produced polyester are apt to aggregate.

The anti-aggregative thermal stability is apt to become high when the particle diameter of the synthetic calcium carbonate particles contained is large or the content of the synthetic calcium carbonate particles is small. It is preferable that the relationship between the average particle diameter ($d_a$) and the content ($W_a^A$) of the synthetic calcium carbonate particles in the polyester material satisfies the following relationship.

$$(8d_a - W_a^A) \geq 1.50$$

The ($8d_a$−$W_a^A$) is more preferably not less than 1.70, still more preferably not less than 1.90.

The aluminum oxide particles added to the polyester film of the present invention will now be explained.

A base film for a magnetic recording medium has come to be required to have scratch resistance in addition to smoothness, slipperiness, abrasion resistance and adhesiveness. This is because when a tape is run at a high speed, scratches are produced at the portion which comes into contact with the head or the like, or scratches are apt to be produced by abrasion dust produced. If there are many scratches, not only are they unfavorable from the point of external appearance but also they cause contamination in the process of production or increase dropouts.

In the present invention, a specific amount of specified aluminum oxide particles are used in order to improve the scratch resistance.

The average particle diameter ($d_b$) of the aluminum oxide particles in the polyester film is 0.005 to 0.5 μm, and the content ($W_b$) thereof is 0.15 to 1.0 wt %. If the average particle diameter ($d_b$) is less than 0.005 μm or the content is less than 0.15 wt %, the improving effect of the scratch resistance is too small. On the other hand, if the average particle diameter ($d_b$) exceeds 0.5 μm or the content exceeds 1.0 wt %, coarse protuberances are produced on the surface of the polyester film, or the surface smoothness is impaired, thereby deteriorating the signal recording property of a magnetic recording medium due to what is called back-side transfer or the like. The average particle diameter ($d_b$) is preferably in the range of 0.01 to 0.1 μm, and the content ($W_b$) is preferably in the range of 0.25 to 0.5 wt %, more preferably 0.35 to 0.5 wt %, still more preferably 0.42 to 0.5 wt %.

The aluminum oxide particles are produced, for example, by thermal decomposition, namely, flame hydrolysis of anhydrous aluminum chloride as a starting material or by ammonium alum thermal decomposition, namely, a method of reacting aluminum hydroxide as a starting material with sulfuric acid and reacting the aluminum sulfate produced with ammonium sulfate to produce ammonium alum.

The primary particle diameters of the aluminum oxide particles obtained by these methods are generally in the range of 5 to 40 nm, but since the particles often form aggregates having a particle diameter of more than 0.5 μm, it is preferable to appropriately pulverize the aggregates before use. In this case, the particles may contain secondary particles aggregated to some extent, but the apparent average particle diameter is not more than 0.5 μm, preferably not more than 0.1 μm. As the crystal form of the aluminum oxide particles, delta or gamma aluminum oxide particles are preferable because they have an excellent improving effect on the abrasion resistance, the scratch resistance and the slittability. Delta aluminum oxide particles are more preferably used.

In the present invention, at least one other kind of particles may be used together with the synthetic calcium carbonate particles and aluminum oxide particles in the present invention, unless it departs from the gist and the scope of the invention. However, it is preferable that the content of the other particles is less than the total content ($W_a$) of the synthetic calcium carbonate particles used in the polyester film, more preferably not more than $0.5 \times Wa$ wt %, even more preferably not more than $0.3 \times Wa$ wt %, still more preferably not more than $0.2 \times Wa$ wt %, especially preferably not more than $0.1 \times Wa$ wt %, most preferably not more than $0.05 \times Wa$ wt % from the point of view of easiness of reclaim.

As an example of the particles used together with the synthetic calcium carbonate particles and aluminum oxide particles in the present invention, precipitated particles may be cited.

The "precipitated particles" here means the particles deposited in the reaction system when a system using an alkali metal compound or an alkali earth metal compound as an ester exchange catalyst is polymerized by an ordinary method. The particles precipitated when terephthalic acid is added in ester exchange reaction or polycondensation reaction, may also be used. These reactions may be carried out in the presence of one or more phosphoric compounds such as phosphoric acid, trimethyl phosphate, triethyl phosphate, tributyl phosphate, acidic ethyl phosphate, phosphorus acid, trimethyl phosphite, triethyl phosphite and tributyl phosphite. In the process of esterification, inert particles can be precipitated. For example, polycondensation reaction is carried out in the presence of an alkali metal compound or an alkali earth metal compound and in the presence or absence of a phosphoric compound before or after the end of esterification reaction. In any case, the precipitated particles in the present invention contain at least one element such as calcium, lithium, antimony and phosphorus.

Additive particles may be used as the particles used together with the synthetic calcium carbonate particles and aluminum oxide particles in the present invention. The "additive particles" here means particles externally added to a polyester. Examples of them are kaolin, talc, carbon black, molybdenum sulfide, gypsum, barium sulfate, lithium fluoride, calcium fluoride, zeolite, calcium phosphate, silicon dioxide and titanium dioxide. Heat-resistant polymer fine particles may also be used as the additive particles. Typical examples thereof are copolymers of a monovinyl compound having only one unsaturated aliphatic bond in one molecule and a compound having at least two unsaturated aliphatic bonds in one molecule as a crosslinking agent, as described in Japanese Patent Publication No. 59-5216 (1984), but heat-resistant polymer fine particles are not restricted thereto. For example, the fine particles of thermoset epoxy resins, thermoset phenol resins, thermoset urea resins, benzoguanamine resins and fluorine resins such as polytetrafluoroethylene are also usable.

Two kinds or more of synthetic calcium carbonate particles having different average particle diameter may be used. Especially, it is favorable to add a small amount of synthetic calcium carbonate particles having a large average particle diameter ($d_c$) to the polyester film of the present invention, because it is possible to improve the take-up property without impairing the signal recording property and the running property. The average particle diameter ($d_c$) of these synthetic calcium carbonate particles is preferably $1.5 \times d_a$ to $3.0 \times d_a$ µm. If the particle diameter ($d_c$) is more than $3.0 \times d_a$ µm, the signal recording property and the running property are sometimes deteriorated. The content of the synthetic calcium carbonate particles having a large average particle diameter in the polyester film is preferably in the range of $0.005 \times W_a^A$ to $0.2 \times W_a^A$ wt %, more preferably $0.01 \times W_a^A$ to $0.1 \times W_a^A$ wt %. If the content of the synthetic calcium carbonate particles having a large average particle diameter is less than $0.005 \times W_a^A$ wt %, the improving effect of the winding property is apt to become small. On the other hand, if the content is more than $0.2 \times W_a^A$ wt %, the signal recording property and the running property are sometimes deteriorated. The particle size distribution of the synthetic calcium carbonate particles having a large average particle diameter is preferably not more than 1.80, more preferably not more than 1.70, most preferably not more than 1.60.

In the production of a polyester containing synthetic calcium carbonate particles in the present invention, the synthetic calcium carbonate particles and additive particles are preferably added during the synthesis reaction of the polyester. They may be especially preferably added after the end of ester exchange reaction or esterification reaction and before the initiation of polycondensation. The particles to be added are generally added in the form of an ethylene glycol slurry, and they may be pulverized, dispersed, classified or filtered, as occasion demands, before added to the polyester. The concentration of the slurry in the ethylene glycol added is 3 to 50 wt %, preferably 5 to 40 wt %, more preferably 10 to 30 wt %. If the concentration of the slurry is less than 3 wt %, the amount of ethylene glycol used increases, and the ethylene glycol unit becomes large. On the other hand, if the concentration of the slurry is more than 50 wt %, the dispersibility of the particles is sometimes deteriorated.

As the polycondensation reaction catalyst for the synthesis of the polyester, a catalyst generally used such as Sb, Ti, Ge, Sn and Si compounds is used.

It is further necessary to simultaneously satisfy the following formulas:

$$0.009 \leq Ra^A \leq 0.020 \tag{7}$$

$$7.0 \leq Rz^A/Ra^A \leq 15 \tag{8}$$

$$0.80 \leq \mu d^{50^A}/\mu d^{1^A} \leq 1.6 \tag{9}$$

wherein $Ra^A$ and $Rz^A$ represent an average center line roughness (µm) of the exposed surface of the polyester film and a surface roughness (µm) at 10 points on the exposed surface of the polyester film, respectively, and $\mu d^{50^A}/\mu d^{1^A}$ represents the ratio of a dynamic friction coefficients of the exposed surface of the polyester film at the fiftieth running to a dynamic friction coefficients of the exposed surface of the polyester film at the first running when the polyester film is run repeatedly.

An average center line roughness ($Ra^A$) of the surface of the film of the present invention is 0.009 to 0.020 µm, preferably 0.010 to 0.017 µm, more preferably 0.010 to 0.015 µm. If the $Ra^A$ is less than 0.009 µm, the running property and the abrasion resistance of the film are deteriorated. On the other hand, if the $Ra^A$ exceeds 0.020 µm, the surface roughness of the film is so high as to deteriorate the signal recording property.

In the film of the present invention, the $Rz^A/Ra^A$ is 7.0 to 15, preferably 8.0 to 13, more preferably 8.0 to 12. If the $Rz^A/Ra^A$ is less than 7.0, the improving effect on the running property and the abrasion resistance of the film is small. On the other hand, if the $Rz^A/Ra^A$ exceeds 15, the improving effect on the wriggling running resistance of the film is insufficient.

In the film of the present invention, the ratio $\mu d^{50^A}/\mu d^{1^A}$ of the dynamic friction coefficients of a surface A (slippery surface) at the fiftieth running to the dynamic friction coefficients of a surface A (slippery surface) at the first running when the polyester film is caused to run repeatedly is in the range of 0.80 to 1.6, preferably 0.9 to 1.4. If the $\mu d^{50^A}/\mu d^{1^A}$ is less than 0.80 or more than 1.6, the running durability of the film is too inferior to be used especially for a non-back-coat type high-grade video tape. It is preferable that there are irregularity units each of which is composed of a protuberance surrounded by a deprssion on the slippery surface of the film. The number of irregularity units having a depression of a major axial diameter of not less than 0.2 μm, based on the surface area of 1 mm² is preferably 1 to 15000, more preferably 5 to 5000. If there is less than 1 irregularity unit, the improving effect on the running property and the surface smoothness may be apt to be reduced. If there are more than 15000 protuberance units, the abrasion resistance may be sometimes lowered.

It is also preferable that the refractive index of the film in the direction of thickness is not less than 1.490. In the case of the refractive index is not less than 1.490, it is possible to enhance the adhesion between the film and a magnetic layer, and the running property and the abrasion resistance of the film. The preferable refractive index of the film in the direction of thickness is 1.492 to 1.505. The film having this physical property is obtained by, for example, adjusting the birefringence index of the film to about $4.0 \times 10^{-2}$ to $8.0 \times 10^{-2}$ after stretched in the machine direction.

When the difference ($\Delta n = n_{TD} - n_{MD}$) between the refractive index ($n_{TD}$) in the transverse direction and the refractive index ($n_{MD}$) in the machine direction of the film is not less than 0.020, the film is excellent, especially, in the cutting property and suitable as a base film for a magnetic tape. The cutting property is a property observed when a magnetic tape is slit with a shear cutter or the like. If the cutting property is bad, the slit surface is sometimes turned up in the streak-like shape, and fines or white abrasion dust may be produced from the slit surface. In such cases, white abrasion dust adheres to the tape, thereby deteriorating the signal recording property or inducing dropouts. The difference ($\Delta n$) is preferably not less than 0.025, more preferably not less than 0.035, most preferably not less than 0.043. If the difference ($\Delta n$) is too large, disadvantages are caused in thermal shrinkage, etc., so that the upper limit of the difference ($\Delta n$) is preferably set at 0.060.

The intrinsic viscosity of the film of the present invention is preferably 0.52 to 0.62, more preferably 0.54 to 0.59. The lower the intrinsic viscosity, the better the cutting property of the film. However, if the intrinsic viscosity is less than 0.52, the film is apt to be broken during film formation. On the other hand, if the intrinsic viscosity exceeds 0.62, the improving effect of the cutting property is insufficient.

The sum of the Young's modulus in the machine direction and the Young's modulus in the transverse direction of the film is preferably not less than 900 kg/mm², more preferably not less than 1000 kg/mm², still more preferably not less than 1050 kg/mm². The difference between the Young's modulus in the transverse direction and the Young's modulus in the machine direction of the film is preferably less than 200 kg/mm², more preferably 100 to 200 kg/mm², still more preferably 150 to 200 kg/mm². If the Young's modulus of the film satisfy the above conditions, the improving effect on the tape edge damage preventive property, the durability and the cutting property of the film favorably increases.

The polyester film of the present invention may be a multilayered film produced by laminating another polyester film (layer (B)).

The multilayered film in the present invention is a film produced by simultaneously melt-extruding each layer from a nozzle of an extruding machine, namely, i.e. co-extrusion, stretching and heat-treating the resultant multilayered sheet.

Although a co-extruded two-layered film will be explained in the following as the multilayered film, the multilayered film is not restricted thereto and the co-extruded film of the present invention may have two or more layers unless it departs from the gist and the scope of the present invention.

In the following explanation, the exposed surface (slippery surface) of the polyester film (layer (A)) will be referred to as a surface A and the exposed surface of the polyester film (layer (B)) will be referred to as a surface B. When the film of the present invention is used as a base film of a magnetic tape, a magnetic layer is generally formed on the surface B of the film. The layer (B) of the present invention may be a monolayer or a multilayer of two or more layers. In the case of a multilayered film of not less than three layers having not less than two layers as the layer (B), a polyester material produced at a low cost is especially preferably used for an intermediate layer of such multilayered film. The polyester material used for the intermediate layer is not specified, but reclaimed polyester, TPA route polyester which contains substantially no particles may be cited.

It is preferable that the average particle diameter ($d_a$) and the content $W_a^A$ of the synthetic calcium carbonate particles in the layer (A) (slippery layer) of the laminated polyester film of the present invention simultaneously satisfy the following formulas:

$$0.30 \leq d_a \leq 0.65 \tag{1'}$$

$$0.35 \leq W_a^A \leq 1.00 \tag{2}$$

$$0.55 \leq d_a + 0.5 W_a^A \leq 0.95 \tag{3'}$$

$$8 d_a - W_a^A \geq 1.50 \tag{4}$$

wherein $d_a$ represents an average particle diameter (μm) of the synthetic calcium carbonate particles in the polyester film, and $W_a^A$ represents the content (wt %) of the synthetic calcium carbonate particles in the polyester film.

The synthetic calcium carbonate particles are preferably used as the particles contained in the layer (B) of the multilayered polyester film of the present invention from the point of view of easiness of reclaim or the like. The content of the synthetic calcium carbonate particles in the outermost layer of the layer (B) is preferably $0.1 \times W_a^A$ to $1.0 \times W_a^A$ wt %, more preferably $0.2 \times W_a^A$ to $0.8 \times W_a^A$ wt %, most preferably $0.25 \times W_a^A$ to $0.70 \times W_a^A$ wt %.

In the present invention, the smaller the content of the synthetic calcium carbonate particles, the more preferable. The content of the synthetic calcium carbonate particles in the whole polyester is preferably not more than 0.30 wt %, more preferably not more than 0.20 wt %, most preferably not more than 0.15 wt %.

The content of the aluminum oxide particles in the laminated polyester film of the present invention is not more than 0.10 wt %, preferably not more than 0.075 wt %, more preferably not more than 0.060 wt %. If the content of the aluminum oxide particles exceeds 0.10 wt %, it is necessary to frequently replace the cutting blade during the production of the film or manufacture of a magnetic tape, thereby inconveniently reducing the productivity.

The smaller the content of the aluminum oxide particles in the layer (B), the more preferable from the point of view of the material cost. However, if the film is reclaimed, a small amount of, for example, about 0.07 wt % of aluminum oxide particles in the layer (B) gives rise to no problem. Especially, the content of the aluminum oxide particles in the outermost layer of the layer (B) is preferably not more than 0.50 wt %, more preferably not more than 0.10 wt %, still more preferably not more than 0.05 wt %, most preferably 0 wt %.

In the multilayered film of the present invention, the ratio of thickness of the layer (A) to the total thickness of the film is preferably 1 to 50%, more preferably 3 to 30%, still more preferably 5 to 25%. If the thickness ratio of the layer (A) exceeds 50%, the slittability is apt to become inferior. On the other hand, if the thickness ratio is less than 1%, it is difficult to control the thickness of the film.

In the multilayered film of the present invention, the thickness $t_A$ (μm) of the layer (A) is preferably $1.0 \times d_a$ to $20 \times d_a$ μm, more preferably $1.4 \times d_a$ to $15 \times d_a$ μm, most preferably $1.8 \times d_a$ to $9.0 \times d_a$ μm. If the $t_A$ is less than $1.0 \times d_a$ μm, it is difficult to control the thickness, so that the improving effect on the running property and the abrasion resistance is apt to be reduced. On the other hand, if the $t_A$ exceeds $20 \times d_a$ μm, the cost-lowering effect is apt to be reduced.

The average center line roughness $Ra^B$ of the exposed surface, i.e., the surface B (the magnetic layer-coating surface) of the layer (B) of the polyester film of the present invention is 0.002 to 0.017 μm, preferably 0.007 to 0.015 μm, more preferably 0.008 to 0.015 μm. If the $Ra^B$ is less than 0.002 μm, the slipperiness of the base film is not good, so that scratches are often produced on the base film, especially, during the process of production of a magnetic tape layer, and the signal recording property of the magnetic tape and the handling property of the film are sometimes deteriorated.

The $Ra^B/Ra^A$ is preferably 0.2 to 1.0, more preferably 0.3 to 0.9, most preferably 0.5 to 0.8. If the $Ra^B/Ra^A$ is in this range, the improving effect on the signal recording property, the running property and the abrasion resistance of the magnetic tape finally obtained is advantageously large.

As the synthetic calcium carbonate particles, the surface-modified synthetic calcium carbonate particles are preferable, which are obtained by surface-treating synthetic calcium carbonate particles with a high-molecular polycarboxylic acid and treating the synthetic calcium carbonate particles with a phosphorus compound represented by the following general formula (12):

wherein R represents a hydrocarbon group having 1 to 10 carbon atoms, l is 1 or 2, m is 1 or 2, n is 1 or 2, and the sum of l and m is 3.

The particle size distribution of the surface-modified synthetic calcium carbonate particles is preferably not more than 1.80, more preferably not more than 1.70, still more preferably not more than 1.60. If the particle size distribution exceeds 1.80, the surface roughness of the film finally obtained becomes nonuniform, which may impair the signal recording property of a magnetic recording medium or deteriorate the withstand voltage.

It is necessary that the average particle diameter ($d_a$) of the surface-modified synthetic calcium carbonate is 0.25 to 0.75 μm. If the $d_a$ is less than 0.25 μm, the running property and the abrasion resistance may be hardly improved. On the other hand, if the value $d_a$ exceeds 0.75 μm, the surface roughness of the film may be so large that not only may be the signal recording property deteriorated but also the wriggling run of the film may be likely to be caused especially when the film is used for a video tape. The average particle diameter ($d_a$) of the surface-modified synthetic calcium carbonate is preferably 0.27 to 0.65 μm, more preferably 0.31 to 0.55 μm, still more preferably 0.38 to 0.45 μm.

Addition of such surface-modified synthetic calcium carbonate particles to a polyester film can impart more excellent properties to the film for magnetic recording media according to the present invention. A method of modifying the surfaces of synthetic calcium carbonate particles will now be explained.

At a first stage, the surfaces of synthetic calcium carbonate particles are treated with a high-molecular polycarboxylic acid. This surface-treatment not only improves the dispersibility of the particles in the polyester and the abrasion resistance of the polyester film, but also enhances the aggregation preventive effect at the surface-treatment by a phosphorus compound at a second stage.

Such a high-molecular polycarboxylic acid is a surface-treating agent such as those which are described, for example, in Japanese Patent Application Laid-Open (KOKAI) Nos. 59-69426 (1984) and 1-256558 (1989). Polycarboxylic acids or alkali salts, ammonium salts thereof, copolymers containing polyacrylic acid units and/or polyacrylic acid derivative units, and copolymers containing polyalkylene glycol units and polyacrylic acid units and/or polyacrylic acid derivative units are preferably used. Examples of such copolymers are a copolymer of a polyacrylic acid and polyethylene glycol monomethacrylate, a copolymer of a polyacrylic acid, methoxypolyethylene glycol and polyethylene glycol monomethacrylate, and copolymers having the polyacrylic acid of the said copolymer, which is neutralized with ammonia or substituted by sodium carbonate polyacrylate.

The amount of high-molecular polycarboxylic acid used as a surface-treating agent is preferably 0.10 to 10 wt %, more preferably 0.50 to 5.0 wt %, still more preferably 0.80 to 3.0 wt % based on the synthetic calcium carbonate particles. If the amount of surface-treating agent is less than 0.10 wt %, the improving effect on the dispersibility of the particles in the polyester and the abrasion resistance of the polyester film is apt to be reduced. Also, the improving effect on the aggregation preventive effect at the surface-treatment by a phosphorus compound at a second stage is apt to be reduced. On the other hand, if the amount of surface-treating agent exceeds 10 wt %, the polymerizability of the polyester is sometimes impaired or the number of protuberances on the surface of the polyester film may be increased.

These surface-treating agents are generally effective when they are added in the process of producing the synthetic calcium carbonate particles.

At a second stage, the surface-treated synthetic calcium carbonate particles are treated with a phosphorus compound represented by the following general formula (12):

wherein R represents a hydrocarbon group having 1 to 10 carbon atoms, l is 1 or 2, m is 1 or 2, n is 1 or 2, and the sum of l and m is 3.

In the above formula, R represents a hydrocarbon group having 1 to 10 carbon atoms, namely, methyl group, ethyl group, propyl group, butyl group. Such a hydrocarbon group may have a substituent such as carobxyl group, alkoxycarbonyl group, hydroxyl group and halogen group. But a hydrocarbon group having no substituent is preferable, because it is industrially easily available and it has a good thermal stability and a large surface modifying effect. Use of a phosphorus compound having a hydrocarbon group (carbon atom number=0), for example, an inorganic phosphorus acid is unsuitable, because a large aggregate of particles is produced by the treatment, and the abrasion resistance improving effect on the polyester film finally obtained is small. On the other hand, if the number of the carbon atom of the hydrocarbon is more than 10, a defect such as foaming may be produced during the polymerization of the polyester. Also, since the deposition amount of the phosphorus compound of the present invention is small, the surface modifying effect is small or the improving effect of the abrasion resistance on the polyester film finally obtained is small. The number of carbon atoms in the hydrocarbon group is preferably 1 to 3, more preferably 2.

In the above formula, l is 1 or 2, m is 1 or 2, n is 1 or 2, and the sum of l and m is 3. If l is 0, namely, the phosphorus compound has no —OH group, since almost no phosphorus compound adheres to (deposits on) the surface of the synthetic calcium carbonate particles, the surface modifying effect is small. If n is 2 and l or m is 3, since the phosphorus compound does not have both —OH group and —OR group, the effect aimed at in the present invention is not obtained. A phosphorus compound in which n is 1 is preferably used in the present invention, because the thermal stability thereof is good.

The phosphorus compound used in the present invention is not specified so long as it satisfies the conditions of the present invention. Examples of preferred phosphorus compounds are monoethyl acid phosphate, diethyl acid phosphate, monomethyl acid phosphate, dimethyl acid phosphate, monopropyl acid phosphate and dipropyl acid phosphate. Ethyl acid phosphate is especially preferable. The phosphorus compound used in the present invention may naturally be a mixture of not less than two phosphorus compounds.

In the treatment at the second stage, the phosphorus compound, preferably a glycol solution of the phosphorus compound, more preferably an ethylene glycol solution of the phosphorus compound is added to the synthetic calcium carbonate particles surfaces-treated with a high-molecular polycarboxylic acid, in the form of a slurry, preferably a glycol slurry, more preferably an ethylene glycol slurry.

The concentration of the synthetic calcium carbonate particles surfaces-treated with a high-molecular polycarboxylic acid in the slurry is preferably 5.0 to 50 wt %, more preferably 10 to 30 wt %. If the concentration of the particles in the slurry is less than 5.0 wt %, it is difficult to produce a polyester containing the particles at a high concentration. On the other hand, if the concentration of the particles in the slurry exceeds 50 wt %, the dispersibility of the particles sometimes lowered.

The amount of the phosphorus compound added is preferably 0.05 to 10.0 mol %, more preferably 0.10 to 4.0 mol %, still more preferably 0.50 to 3.0 mol %, based on the synthetic calcium carbonate particles. If the amount of the phosphorus compound added is less than 0.05 mol %, the surface modifying effect is reduced. On the other hand, if the amount of the phosphorus compound added exceeds 10 mol %, the aggregate of the synthetic calcium carbonate particles may become large, or the dispersibility of the particles is sometimes lowered. The temperature of the slurry during or after the addition of the phosphorus compound is preferably lower than 100° C., more preferably lower than 80° C., most preferably lower than 50° C. If the temperature of the slurry during or after the addition of the phosphorus compound is not lower than 100° C., a large aggregate of particles is sometimes produced in the slurry.

A compound having a phosphorus atom generally deposits to the surface of the synthetic calcium carbonate particles surfaces-treated with the phosphorus compound. The amount of compound deposited can be measured by fluorometry. The amount thereof is preferably 0.05 to 5.0 mol %, more preferably 0.10 to 2.0 mol %, based on the synthetic calcium carbonate particles used. If the amount of compound having a phosphorus atom which has deposited to the surfaces of synthetic calcium carbonate particles is less than 0.05 mol %, the surface modifying effect is apt to be reduced. On the other hand, if the amount exceeds 5.0 mol %, the dispersibility of the particles is sometimes lowered or the abrasion resistance of the polyester film sometimes becomes inferior.

The average particle diameter of the synthetic calcium carbonate particles sometimes becomes large by the surface-treatment with the phosphorus compound. If the average particle diameter becomes too large, it is unfavorable, because the surface uniformness of the polyester film finally obtained may be impaired, or the number of coarse protuberances sometimes become too large. If the ratio of the average particle diameter of the synthetic calcium carbonate particles before surfaces-treated with the phosphorus compound to the average particle diameter of the synthetic calcium carbonate particles after surfaces-treated with the phosphorus compound is preferably not less than 0.60, more preferably not less than 0.65, still more preferably not less than 0.70.

The particle size distribution of the synthetic calcium carbonate particles after surfaces-treated with the phosphorus compound, is preferably not more than 1.80, more preferably not more than 1.70, particularly preferably not more than 1.65. If the value exceeds 1.80, the surface roughness of the film finally obtained becomes nonuniform, which may impair the signal recording property of a magnetic recording medium or deteriorate the withstand voltage.

The particles are preferably added during the synthesis reaction of the polyester. They may be especially preferably added after the end of ester exchange reaction or esterification reaction and before the initiation of polycondensation. The particles are generally added in the form of an ethylene glycol slurry, and they may be pulverized, dispersed, classified or filtered, as occasion demands, before they are added to the polyester. However, it is better not to subject the surface of the synthetic calcium carbonate particles to pulverization treatment with a high-molecular polycarboxylic acid at the first stage. This is because if the particles are pulverized after the surfaces of the synthetic calcium carbonate particles are treated with a high-molecular polycarboxylic acid, the surface modifying effect is reduced, so that a large aggregate of particles is sometimes produced in the slurry, or the surface uniformness of the polyester film finally obtained may be impaired, or the abrasion resistance improving effect on the polyester film may be reduced. The concentration of the ethylene glycol slurry added is 5.0 to 50 wt %, preferably 10 to 40 wt %,. If the concentration of the slurry is less than 5.0 wt %, the amount of ethylene glycol used increases, and the ethylene glycol unit becomes large. On the other hand, if the concentration of the slurry is more than 50 wt %, the dispersibility of the particles is sometimes deteriorated.

The content ($W_a^A$) of the surface-modified synthetic calcium carbonate particles is 0.35 to 1.0 wt %, preferably 0.45 to 0.9 wt % based on the polyester. If the content is less than 0.35 wt %, the running property and the abrasion resistance may be hardly improved. On the other hand, if the content exceeds 1.0 wt %, the surface roughness of the film becomes so large that when it is used for a magnetic recording medium, the signal recording property may be deteriorated.

As described above, a specific amount of specified synthetic calcium carbonate particles with the surfaces modified by the above-described method are added to the polyester film of the present invention. If the following conditions are satisfied, the effect of mixing the surface-modified synthetic calcium carbonate particles is more remarkable.

It is preferable that the value $(d_a+0.5W_a{}^A)$ is in the range of 0.50 to 0.95, more preferable that the $(d_a+0.5W_a{}^A)$ is 0.60 to 0.80. If the $(d_a+0.5W_a{}^A)$ is less than 0.50, the running property, the wriggling running resistance and the abrasion resistance may be inferior especially as a film for a non-back-coat type high-grade video tape. On the other hand, if the value $(d_a+0.5W_a{}^A)$ exceeds 0.95, the surface roughness of the film may be so large that the signal recording property may be sometimes deteriorated.

The melt resistivity of the polyester film or the polyester material in the melton state is preferably $1.0\times10^6$ to $5.0\times10^8$ Ω·cm, more preferably $5.0\times10^6$ to $1.0\times10^8$ Ω·cm.

In order to adjust the melt resistivity to a preferable value, a metal component is solubilized in the polyester. For example, a method of adding a comparatively small amount of, e.g., not more than an equivalent of phosphorus compound to the metal element which is used as an ester exchange catalyst or the metal element which is added after an ester exchange reaction or esterification reaction, as occasion demands, is preferably adopted. On the other hand, in order to increase the melt resistivity, the amount of metal compound which is dissolved in the polyester is reduced.

In the present invention, either of ester exchange reaction and esterification reaction may be adopted, but the ester exchange reaction method is preferable. For example, it is preferable to polymerize the polyester containing the particles in accordance with the present invention in the presence of 0.3 to 1.0 equivalent, more preferably 0.3 to 0.8 equivalent, of a phosphorus compound by using a magnesium catalyst, calcium catalyst, a manganese catalyst or the like. The phosphorus compound here includes the phosphorus compound used for the surface treatment in the present invention.

A method of producing the polyester film of the present invention will now be explained.

Polyester materials containing the particles specified by the present invention are prepared, and after they are dried by an ordinary method, they are extruded by an extruding machine at a temperature of 200° to 320° C., and chilled and solidified on a casting drum, thereby obtaining an amorphous film. At this time, an ordinary electrostatic pinning method is preferably adopted because an amorphous sheet having a uniform thickness is obtained.

In order to produce a laminated polyester film, the polyester materials are extruded by at least two extruding machines at a temperature of 200° to 320° C., and chilled and solidified on a casting drum, thereby obtaining an amorphous film having two or more layers. The amorphous sheet is then biaxially stretched and heat-set. After the sheet is stretched to 2.5 to 9.0 times in the machine direction, it is stretched to not less than 3.0 times, preferably not less than 3.3 times, more preferably not less than 3.7 times in the transverse direction at 110° to 180° C. More preferably, the resultant biaxially oriented film is restretched to 1.05 to 2.5 times in the machine direction at 200° to 250° C. The biaxially oriented film is then heat-treated in the temperature range of 200° to 250° C., preferably 210° to 240° C. It is possible to appropriately adopt a method of heat-setting the sheet before restretching the sheet in the machine direction, a method of relaxing the sheet after restretching the sheet, a method of stretching the sheet in the machine direction by a minute magnification before or after restretching the sheet or the like. It is also possible to restretch the sheet in the transverse direction. The sheet may be subjected to various surface treatments and the like, if necessary, in the film forming process.

In the stretching process, the stretch ratio in the machine direction is especially preferably in the range of 4.0 to 9.0. In order to realize such a high stretch ratio, the following method is preferably adopted. (1) The amorphous sheet is stretched to 1.2 to 4.0 times in the machine direction at one stage or at multiple stages so that the birefringence index is $1.0\times10^{-3}$ to $2.5\times10^{-2}$, preferably $1.0\times10^{-2}$ to $2.5\times10^{-2}$, more preferably $1.5\times10^{-2}$ to $2.5\times10^{-2}$, (2) the stretched film is stretched again to 1.1 to 3.5 times in the machine direction at one stage or at multiple stages so that the birefringence index is $3.0\times10^{-2}$ to $8.0\times10^{-2}$ without chilling the film to not higher than the glass transition temperature, (3) the film is chilled to not higher than the glass transition temperature, and (4) the film is heated to not lower than the glass transition temperature and stretched in the machine direction at one stage or at multiple stages.

In the polyester film of the present invention, in order to obtain the preferable film strength and birefringence index, it is preferable to restretch the film to 1.05 to 2.5 times in the machine direction at 110° to 180° C. and/or restretch the film in the transverse direction before the film is heat-treated after biaxially stretched.

It is possible to appropriately add a stabilizer, a coloring agent and an antistatic agent to the polyester which constitutes each layer of the film of the present invention.

The thickness of the polyester film is generally 3 to 20 μm, preferably 7 to 17 μm, more preferably 12 to 17 μm.

The film of the present invention is excellent in the manufacturing stability and the material cost. As to the properties, the film of the present invention has a uniform fine surface structure, and especially has excellent abrasion resistance, running property and scratch resistance, so that it is very useful as a base film for a magnetic recording medium including a non-back-coat type high-grade video tape. Thus, the polyester film of the present invention has a high industrial value.

EXAMPLES

The present invention will be explained in more detail with reference to the following examples, but the present invention is not restricted to those examples.

The definitions and the methods of measuring various physical properties and characteristics are as follows. "Part" in the Examples and the Comparative Examples refer to "part by weight".

(1) Average Particle Diameter and Particle Size Distribution

The particle diameters were measured by using a centrifugal settling-type particle size distribution measuring machine (Model SA-CP3, manufactured by Shimazu Seisakusho Ltd.), and the average particle diameter ($d_{50}$) was calculated as the diameter at the point of a percentage by weight of 50% of the cumulative volume calculated as an equivalent sphere.

The ratio $d_{25}/d_{75}$ of the particle diameter $d_{25}$ at the point of 25% of the total accumulated weight and the particle diameter $d_{75}$ at the point of 75% when the volumes of the particle group were accumulated in order of size, was regarded as the index of the particle size distribution.

(2) Average Particle Diameter ($d_a$, $d_b$, $d_c$) of the Particles in the Polyester The polyester resin was removed from the polyester containing the particles by plasma low-temperature incineration under the condition that only the polyester was incinerated without damaging the particles, thereby exposing the particles. The exposed particles were observed by SEM and the image of the particles was analyzed by an image analyzer. The number-average particle diameter ($d_a$, $d_b$, $d_c$) of more than 1000 particles was calculated as the diameter of an equivalent sphere. The aggregated particles were regarded as one particle, and the particle diameter was calculated as an equivalent sphere.

(3) Anti-aggregative Thermal Stability

The polyester containing the particles was dried, and heat-treated at 280° C. for 8 hours under a normal pressure in an atmosphere of nitrogen. The average particle diameter ($d_a'$) of the particles in the heat-treated polyester was then measured. The ratio ($d_a/d_a'$) of the average particle diameters of the particles before and after heat-treatment was obtained as the index of the thermal stability for preventing aggregation, and the evaluation was conducted by the following three ranks. It is desirable that the rank is A.

$d_a/d_a' \geq 0.70$ (very good manufacturing stability)　　A $0.60 \leq d_a/d_a' < 0.70$ (intermediate between said A and C described later)　　B $d_a/d_a' < 0.60$ (bad manufacturing stability, difficult to manufacture)C

(4) Intrinsic Viscosity of the Film 1 g of a polymer was dissolved in 100 ml of a mixed solvent of phenol/tetrachloroethane (weight ratio of 50:50), and the intrinsic viscosity was measured at 30° C.

(5) Refractive Index of the Film

The refractive index ($n\alpha$) in the direction of thickness of the film, the refractive index ($n_{TD}$) in the transverse direction of the film and the refractive index ($n_{MD}$) in the machine direction of the film were measured by an Abbe refractometer manufactured by Atago Kogakusha. Each refractive index was measured by using sodium D line.

(6) Slittability

The edge portion of the biaxially oriented and heat-set film was slit with a stainless steel cutting blade over a length of 40000 m in the film forming process, and the degree of damage of the cutting blade was visually evaluated. The evaluation was divided into 3 ranks. It is desirable that the rank is A.

The cutting blade was hardly damaged so that it was not necessary to replace the blade.　　A Intermediate between said A and B described later.　　B The cutting blade was obviously damaged so that it was necessary to replace the blade.　　C

(7) Young's Modulus (Modulus in Tension)

Young's modulus was measured at 23° C. and 50% RH by Intesco Model 2001, manufactured by Intesco Co., ltd. A sample film of (300 mm in length and 200 mm in width) was pulled at a strain speed of 10%/min, and Young's modulus was calculated from the following formula by using the initial straight line portion of the stress-strain curve:

$E = \Delta \rho / \Delta \epsilon$ wherein E represents the Young's modulus in tension (kg/mm2), $\Delta \rho$ represents the difference in stress between two points on the straight line due to the difference in the original average sectional area, and $\Delta \epsilon$ represents the difference in strain between the above-described two points.

(8) Surface Roughness and 10-Point Average Roughness (Rz)

The center line average roughness (Ra) was measured in accordance with JIS B0601, by using a surface roughness tester SE-3F (manufactured by Kosaka Kenkyusho Co., Ltd.). The radius of the stylus was 2.0 µm and the load was 30 mg and the cut-off value was 0.08 mm.

A portion of a sampling length (2.5 mm) was sample in the direction of the center line from cross sectional curve obtained by using a surface roughness apparatus (SF-3F) manufactured by Kosaka Kenkyusho Co., Ltd. The difference between the average height of 1st to 5th maximum heights and the average height of 1st to 5th maximum depths on the line parallel to the average line of the cut-out portion was indicated by an average value for 10 points. The 10-point average roughness (Rz) was determined as an average value from 10 cross sectional curves obtained from the surface of the sample. Further, the tip radius of the stylus was 2.0 µm, the load was 30 mg and the cut-off value was 0.08 mm.

The smaller the value Rz/Ra, the more uniform the surface is.

(9) Number of Irregularity Units on the Film Surface

A protuberance surrounded by a depression was regarded as one unit. Aluminum was deposited on the surface A of the film, and the film surface was photographed by a differentially coherent microscope manufactured by Nikon Corporation. The number of irregularity units (per surface area of 1 mm$^2$) having a major axial diameter of not less than 0.2 µm was counted.

(10) Running Durability (Friction Coefficients $\mu d^1$ at the First Running and $\mu d^{50}$ at the Fiftieth Running)

The film was brought into contact with a fixed hard chromium-plated metal pin (diameter: 6 mm, surface roughness: 3S) at a contact angle of (θ) 135° and was caused to run at a rate of 3.3 cm/sec while applying a load ($T_2$) of 53 g to one end. The resistance ($T_1$, g) at the other end was measured at 50% RH and the friction coefficient (µd) was obtained from the following formula:

$\mu d = 0.424 \cdot \ln (T_1/53)$

The same portion of the base film surface of the magnetic tape was caused to run repeated by the above method. The dynamic friction coefficients $\mu d^1$ at the first running and $\mu d^{50}$ and at the fiftieth running were measured and the $\mu d^{50}/\mu d^1$ was obtained.

(11) Number of Coarse Protuberances

Aluminum was deposited on the surface of the film, and the number of coarse protuberances was measured by a double beam method by using a Nikon optiphoto interference microscope. The number of protuberances (not less than 0.81 µm in height) showing interference fringes of the third order or more at a measuring wavelength of 0.54 µm was calculated in the area of 100 cm$^2$ as the coarse protuberances.

(12) Winding Property

The appearance of the roll of the polyester film when the polyester film was wound, was synthetically judged, for example, whether each edge is in alignment or not, and whether there is a wrinkle in the film or not.

(13) Wear Property

The surface A of the film having a width of 10 mm and a length of 200 m was brought into contact with a fixed hard chromium-plated metal pin (material: SUS 420-J2, finish: 0.2S) having a diameter of 6 mm at a contact angle of 135° and was caused to run over a length of 5000 m at a rate of 11.4 m/min and an initial tension of 300 g. The amount of abrasion dust which had adhered to the pin was visually evaluated on the basis of the following criteria. It is desirable that the rank is A.

| | |
|---|---|
| No adhesion | A |
| Slight adhesion Rank | B |
| Small amount of adhesion (larger amount than in Rank B) | C |
| A large amount of adhesion | D |

(14) Properties of the Magnetic Tape 200 parts of magnetic fine powder, 30 parts of polyurethane resin, 10 parts of nitrocellulose, 10 parts of a vinyl chloride-cellulose acetate copolymer, 5 parts of lecithin, 100 parts of cyclohexanone, 100 parts of methylisobutyl ketone and 300 parts of methylethyl ketone were mixed and dispersed for 48 hours in a ball mill. Thereafter, 5 parts of a polyisocyanate compound was added thereto to produce a magnetic coating composition. After the magnetic coating composition was applied to the surface (B) of the polyester film, the film was magnetically oriented before the coating was sufficiently dried sand solidified. Thereafter, the film was dried, thereby forming a magnetic layer of 2 μm in thickness.

The film coated with the magnetic layer having a length of 5000 m was then caused to run 7 times repeatedly under a 5-stage supercalender composed of a mirror-finish metal rolls and polyester composite resin rolls at a rate of 80 m/min, at a roll temperature of 85° C. and a linear pressure of 250 kg/cm. The amount of white abrasion dust adhering to the resin roll surface was visually observed an evaluated on the following criteria. It is desirable that the rank is A.

| | |
|---|---|
| Substantially no deposition of white abrasion dust | A |
| Very slight deposition of white abrasion dust | B |
| Apparently detectable deposition of White abrasion dust | C |

The film subjected to calender-treatment was slit to a width of ½ inch to obtain a video tape. The properties of the magnetic tape was then evaluated by running the tape at an ordinary speed by using a video deck Model NV-3700, manufactured by Matsushita Electric Industrial Co., Ltd. Signal recording property (output of VTR head)

The output of the VTR head at a measuring frequency of 4 MHz was measured by a synchroscope and evaluated on the following criteria in comparison with that of a reference tape (high-grade video tape having a back coat). It is desirable that the rank is A.

| | |
|---|---|
| Equal or superior to the reference tape | A |
| Inferior to the reference tape | B |
| Apparently inferior to the reference tape and unsuitable for practical use | C |

Number of dropouts

The signals of 4.4 MHz recorded on the video tape were reproduced. The number of dropouts was counted for about 20 minutes by a dropout counter manufactured by Okura Industrial Co., Ltd and was converted into a number of dropouts per minute. The measurement was repeated 20 times and the property was evaluated on the following criteria in comparison with that of a reference tape (high-grade video tape having a back coat). It is desirable that the rank is A.

| | |
|---|---|
| Equal or superior to the reference tape | A |
| Inferior to the reference tape | B |
| Apparently inferior to the reference tape and unsuitable for practical use | C |

(15) Wriggling Running Resistance

The video tape was run for 180 minutes by using a commercially available VHS type VTR, while setting the back tension of the feeding side at zero. The running state of the tape was observed at the pin immediately before the head cylinder and evaluated on the following criteria. It is desirable that the rank is A.

| | |
|---|---|
| The tape deviated from the right position by less than 0.5 mm | A |
| The tape deviated from the right position by not less than 0.5 mm and less than 2 mm | B |
| C: The tape deviated from the right position by more than 2 mm | C |

(16) Scratch Resistance

The base film surface (surface A) of the magnetic tape slit to a width of ½ inch was brought into contact with a hard chrome-plate metal pin 6 mm in diameter (finish: 3S) at a tension of 50 g, a contact angle of 135° and a speed of 3 m/sec.

Aluminum was deposited under a vacuum onto the abrased surface to a thickness of about 1,000 Å and the degree of scratching was visually judged in accordance with the following criteria. It is desirable that the rank is 5.

| | |
|---|---|
| A great many scratches | 1 |
| Many scratches | 2 |
| Intermediate between the rank 2 and rank 4 described later | 3 |
| A few scratches | 4 |
| No scratch | 5 |

(17) Cutting Property (1)

The magnetic tape coated over a large width was slit with a new shear cutter to a width of ½ inch over a length of 100 to 500 m. The slit surface of the magnetic tape was observed through a microscope, and the cutting property was evaluated in accordance with the following criteria. It is desirable that the rank is A.

| | |
|---|---|
| Very good without being turned up in the shape of a string or producing abrasion dust | A |
| Intermediate between said A and C described later | B |
| The slit surface was turned up in the shape of a string and white abrasion dust was produced at many portions | C |

(18) Cutting Property (2)

The magnetic tape coated over a large width was slit with a new shear cutter to a width of ½ inch over a length of 50000 m. The slit surface of the magnetic tape was observed through a microscope, and the cutting property was evaluated in accordance with the following criteria. It is desirable that the rank is A.

| | |
|---|---|
| Very good without being turned up in the shape of a string or producing abrasion dust | A |
| Intermediate between said A and C described later | B |
| The slit surface was turned up in the shape of a string and white abrasion dust was produced at many portions | C |

(19) Amount (Cp) of Phosphorus Compound Deposition to the Surfaces of the Particles The solid phase and the liquid phase of the ethylene glycol slurry of the particles surface-treated with a phosphorus compound were separated from each other by an ultracentrifuge. The solid phase was suspended in ethylene glycol. The solid phase and the liquid phase of the suspension were separated from each other again by the ultracentrifuge, and the solid phase was suspended in ethylene glycol. This operation was repeated 5 times, and the content of the phosphorus atoms in the solid phase obtained was measured by fluorometry so as to obtain the amount Cp (mol %/particles) of phosphorus compound which had deposited on the surfaces of the particles.

(20) Melt Resistivity ρV 12.0 of the polyester was charged in a side-arm test tube, and it was completely dissolved in an oil bath of 285° C. After the complete deairation by the repetition of an evacuation and nitrogen gas blowing process, stainless steel electrodes were inserted into the test tube. This state was held for 10 minutes, and thereafter a direct current of 3 kV was applied. The current value obtained immediately after the application of the current was read, and the resistivity was calculated from the following formula:

$$\rho V = (3000 \times S y)(I \times l)$$

wherein ρV represents the resistivity (Ω·cm), I represents the current value (A), S represents the cross section (cm²) of the electrode, and l represents the distance (cm) between the electrodes.

Example 1

100 parts of dimethyl terephthalate, 60 parts of ethylene glycol and 0.09 part of magnesium acetate tetrahydrate were charged into a reactor and heated to carry out ester exchange reaction, while raising the temperature and distilling off methanol. The reaction temperature was gradually raised to 230° C. in about 4.5 hours after the start of the reaction, whereby the ester exchange reaction was substantially completed.

1.10 parts of block calcite-type synthetic calcium carbonate particles which had an average particle diameter of 0.40 μm, a particle size distribution $d_{25}/d_{75}$ of 1.55 and which had been pulverized, classified and filtrated in advance were added to the reaction product in the form of an ethylene glycol slurry. The surfaces of the calcium carbonate particles had been treated in advance with 2% (based on the particles) of a copolymer of a polyacrylic acid having a part of the carobxyl group neutralized with ammonia, methoxypolyehtylene glycol and polypropylene glycol monomethacrylate.

Thereafter, 0.03 part of phosphoric acid and 0.04 part of antimony trioxide were added to the reaction mixture to carry out polycondensation for 4 hours, thereby obtaining a polyester material ($a_1$) having an intrinsic viscosity of 0.61, and containing calcium carbonate particles of an average particle diameter $d_a$ of 0.40 μm. When the polyester ($a_1$) was heat-treated, the ratio of the average particle diameters of the particles before and after heat-treatment was 0.82. It was thus confirmed that the polyester ($a_1$) had a high anti-aggregative thermal stability.

Separately from this, the same polycondensation reaction in the production of the polyester ($a_1$) was carried out for 4 hours except that 1.00 part by weight of block calcite-type synthetic calcium carbonate particles having an average particle diameter of 0.80 μm and a particle size distribution $d_{25}/d_{75}$ of 1.51 were added to the reaction product, thereby obtaining a polyester ($a_2$) having an intrinsic viscosity of 0.60, and containing calcium carbonate particles of an average particle diameter $d_c$ of 0.80 μm. When the polyester ($a_2$) was heat-treated, the value $d_a/d_a'$ (after heat treatment) was 0.99. It was thus confirmed that the polyester ($a_2$) had a high anti-aggregative thermal stability.

In addition, the same ester exchange reaction and polycondensation in the production of the polyester ($a_1$) were carried out except that 1.50 parts of delta aluminum oxide particles having an average particle diameter of 0.03 μm were added in place of the synthetic calcium carbonate particles, thereby obtaining a polyester (A) having an intrinsic viscosity of 0.60.

Further, a polyester (B) having substantially no particles and having an intrinsic viscosity of 0.62 was obtained by the same ester exchange reaction and polycondensation as in the production of the polyester ($a_1$) except that no synthetic calcium carbonate particles were added.

A biaxially oriented polyester film was then produced from these polyesters ($a_1$), ($a_2$), (A) and (B) which were blended in the weight ratio of 55:2:20:23.

The mixed polyester was dried and melt-extruded at 290° C. so as to obtain an amorphous sheet. By utilizing the peripheral speed of multistage nip rolls, the film was stretched to 3.0 times in the machine direction at a film temperature of 112° C. at a first stage, and then continuously stretched to 1.5 times in the transverse direction at a film temperature of 113° C. at a second stage. The birefringence index of the film after stretched at the first stage was $1.5 \times 10^{-2}$, and the birefringence index of the film after stretched at the second stage was $3.9 \times 10^{-2}$.

After the film obtained was temporarily chilled to 40° C., it was heated to 98° C. and stretched to 1.2 times in the machine direction. The birefringence index of the film stretched in the machine direction was $6.1 \times 10^{-2}$.

This film was then stretched to 3.95 times in the transverse direction by a tenter, and further stretched to 1.05 times in the machine direction. The film was thereafter heat-treated at 220° C. to obtain a film of 15 μm in thickness.

A magnetic layer was formed on the film to obtain a magnetic tape, and the properties thereof were evaluated.

Example 2

The same polycondensation reaction as in the production of the polyester ($a_1$) in Example 1 was carried out for 4 hours except for using 1.10 parts of block calcite-type synthetic calcium carbonate particles having an average particle diameter of 0.43 μm and a particle size distribution $d_{25}/d_{75}$ of 1.55, thereby obtaining a polyester ($a_3$) having an intrinsic viscosity of 0.60, and containing calcium carbonate particles of an average particle diameter $d_a$ of 0.43 μm. When the polyester ($a_3$) was heat-treated, the value $d_a/d_a'$ (after heat treatment) was 0.93. It was thus confirmed that the polyester ($a_3$) had a high anti-aggregative thermal stability.

A film was obtained in the same way as in Example 1 by blending the polyester ($a_3$) and the polyesters in Example 1 except that the contents of the particles were as shown in Table 1, and the properties of the film were evaluated.

Comparative Example 1

A film was obtained in the same way as in Example 1 by using the polyesters in Example 1 except that the contents of the particles were as shown in Table 1 and the birefringence index of the film was 0.006, and the properties of the film were evaluated.

Comparative Example 2

The same polycondensation reaction as in the production of the polyester ($a_1$) in Example 1 was carried out for 4 hours except for using 1.10 parts of block calcite-type synthetic calcium carbonate particles having an average particle diameter of 0.55 μm and a particle size distribution $d_{25}/d_{75}$ of 1.52, thereby obtaining a polyester ($a_4$) having an intrinsic viscosity of 0.60, and containing calcium carbonate particles of an average particle diameter $d_a$ of 0.55 μm. When the polyester ($a_4$) was heat-treated, the value $d_a/d_a'$ (after heat treatment) was 0.96. The polyester ($a_4$) had too low anti-aggregative thermal stability.

A polyethylene terephthalate film was obtained in the same way as in Example 1 by blending the polyester ($a_4$) and the polyesters in Example 1 except that the content of the particles were as shown in Table 2, and the properties of the film were evaluated.

Comparative Example 3

The same polycondensation reaction as in the production of the polyester ($a_1$) in Example 1 was carried out for 4 hours except for using 1.50 parts of block calcite-type synthetic calcium carbonate particles which had an average particle diameter of 0.31 μm and a particle size distribution $d_{25}/d_{75}$ of 1.73 and which had been subjected to no surface treatment, thereby obtaining a polyester ($a_5$) having an intrinsic viscosity of 0.60, and containing calcium carbonate particles of an average particle diameter $d_a$ of 0.31 μm. When the polyester ($a_5$) was heat-treated, the value $d_a/d_a'$ (after heat treatment) was 0.44. The polyester ($a_5$) had too low anti-aggregative thermal stability.

A polyethylene terephthalate film was obtained in the same way as in Example 1 by blending the polyester ($a_5$) and the polyesters in Example 1 except that the contents of the particles were as shown in Table 2, and the properties of the film were evaluated.

Comparative Example 4

The same polycondensation reaction as in the production of the polyester ($a_1$) in Example 1 was carried out for 4 hours except for using 2.00 parts of block kaolin particles having an average particle diameter of 0.31 μm and a particle size distribution $d_{25}/d_{75}$ of 2.63, thereby obtaining a polyester (C) having an intrinsic viscosity of 0.68, and containing calcium carbonate particles of an average particle diameter $d_a$ of 0.31 μm.

When the polyester (C) was heat-treated, the value $d_a/d_a'$ (after heat treatment) was 0.98. It was thus confirmed that the polyester (C) had a high anti-aggregative thermal stability.

A film was obtained in the same way as in Example 1 except that the birefringence index of the film was 0.025 by blending the polyester (C) and the polyesters in Example 1, except that the contents of the particles were as shown in Table 2, and the properties of the film were evaluated.

The results obtained are collectively shown in Tables 1 and 2.

| | Example 1 | Example 2 | Comparative Example 1 |
|---|---|---|---|
| Particles | Calcite calcium carbonate | Calcite calcium carbonate | Calcite calcium carbonate |
| Particle size distribution $d_{25}/d_{75}$ | 1.55 | 1.55 | 1.55 |
| Average particle diameter $d_a$ (μm) | 0.40 | 0.43 | 0.40 |
| Thermal stability | A | A | A |
| Content $w_a$ (wt %) | 0.61 | 0.50 | 0.26 |
| ($d_a + 0.5 w_a^A$) | 0.70 | 0.68 | 0.53 |
| ($8d_a - w_a^A$) | 2.59 | 2.94 | 2.94 |
| Particles | Calcite calcium carbonate | Calcite calcium carbonate | — |
| Particle size distribution $d_{25}/d_{75}$ | 1.51 | 1.51 | — |
| Average particle diameter $d_c$ (μm) | 0.80 | 0.80 | — |
| Thermal stability | A | A | — |
| Content (wt %) | 0.02 | 0.02 | — |
| Particles | Aluminum oxide | Aluminum oxide | Aluminum oxide |
| Average particle diameter $d_b$ (μm) | 0.03 | 0.03 | 0.03 |
| Content $w_b$ (wt %) | 0.30 | 0.30 | 0.17 |

| | Example 1 | Example 2 | Comp. Example 1 |
|---|---|---|---|
| Film Properties | | | |
| Winding property | Very good | Very good | Bad |
| Δn | 0.046 | 0.045 | 0.006 |
| nα | 1.493 | 1.494 | 1.494 |
| Intrinsic viscosity η | 0.59 | 0.59 | 0.62 |
| Young's modulus (kg/mm²) | 430 | 425 | 430 |
| machine direction | | | |
| transverse direction | 620 | 615 | 420 |
| Ra (μm) | 0.013 | 0.013 | 0.009 |
| Rz/Ra | 10 | 11 | 14 |
| Number of irregularity units (per/mm²) | 1440 | 1540 | 720 |
| Abrasion resistance | A | A | B |
| Dirt on calendar | A | A | A to B |
| Magnetic tape properties | | | |
| Cutting property | A | A | B |
| Running durability μd⁵⁰/μd¹ | 1.3 | 1.3 | 1.7 |
| Wriggling running resistance | A | A | B |
| Signal recording property | A | A | B |
| Dropout | A | A | A to B |
| Scratch resistance | 5 | 5 | 3 |

TABLE 2

| | Comparative Example 2 | Comparative Example 3 | Comparative Example 4 |
|---|---|---|---|
| Particles | Calcite calcium carbonate | Calcite calcium carbonate | Kaolin |

TABLE 2-continued

|  | Comparative Example 2 | Comparative Example 3 | Comparative Example 4 |
|---|---|---|---|
| Particle size distribution $d_{25}/d_{75}$ | 1.52 | 1.73 | 2.63 |
|  | 1.52 | 1.73 | 2.63 |
| Average particle diameter $d_a$ (μm) | 0.55 | 0.31 | 0.31 |
| Thermal stability | A | C | A |
| Content $w_a$ (wt %) | 0.54 | 1.10 | 0.60 |
| $(d_a + 0.5\ w_a^A)$ | 0.82 | 0.86 | 0.61 |
| $(8\ da - w_a^A)$ | 3.86 | 1.38 | 1.88 |
| Particles | Aluminum oxide | Aluminum oxide | Aluminum oxide |
| Average particle diameter $d_b$ (μm) | 0.03 | 0.03 | 0.03 |
| Content $w_b$ (wt %) | 0.30 | 0.30 | 0.30 |
| Film Properties |  |  |  |
| Winding property | Slightly bad | Slightly bad | Slightly bad |
| Δn | 0.046 | 0.045 | 0.025 |
| nα | 1.493 | 1.494 | 1.494 |
| Intrinsic viscosity (η) | 0.59 | 0.59 | 0.65 |
| Young's modulus (kg/mm²) |  |  |  |
| machine direction | 430 | 425 | 430 |
| transverse direction | 620 | 615 | 540 |
| Ra (μm) | 0.017 | 0.015 | 0.014 |
| Rz/Ra | 16 | 10 | 17 |
| Number of irregularity units (per/mm²) | 1520 | 470 | 1450 |
| Abrasion resistance | B | B | B to C |
| Dirt on calendar | A to B | B | B to c |
| Magnetic tape properties |  |  |  |
| Cutting property | A | A | A to B |
| Running durability $μd^{50}/μd^1$ | 1.7 | 1.8 | 1.9 |
| Wriggling running resistance | A to B | B | B to C |
| Signal recording property | B to C | B | B to C |
| Dropout | B | B to C | B to C |
| Scratch resistance | 3 | 3 | 3 |

Example 3

100 parts of dimethyl terephthalate, 60 parts of ethylene glycol and 0.09 part of magnesium acetate tetrahydrate were charged into a reactor and heated to carry out ester exchange reaction, while raising the temperature and distilling off methanol. The reaction temperature was gradually raised to 230° C. in about 4.5 hours after the start of the reaction, whereby the ester exchange reaction was substantially completed.

1.10 parts of block calcite-type synthetic calcium carbonate particles which had an average particle diameter of 0.46 μm and a particle size distribution $d_{25}/d_{75}$ of 1.54 and which had been pulverized, classified and filtered in advance were added to the reaction product in the form of an ethylene glycol slurry. The surfaces of the particles had been treated in advance with 2% (based on the particles) of a copolymer of a polyacrylic acid having a carobxyl group neutralized with ammonia, methoxypolyehtylene glycol and polypropylene glycol monomethacrylate.

Thereafter, 0.03 part of phosphoric acid and 0.04 part of antimony trioxide were added to the reaction mixture to carry out polycondensation for 4 hours, thereby obtaining a polyester material ($a_1'$) having an intrinsic viscosity of 0.61, and containing calcium carbonate particles of an average particle diameter $d_a$ of 0.46 μm. When the polyester ($a_1'$) was heat-treated, the value $d_a/d_a'$ (after heat treatment) was 0.84. It was thus confirmed that the polyester ($a_1'$) had a high anti-aggregative thermal stability.

Separately from this, the same polycondensation reaction as in the production of the polyester ($a_1'$) was carried out for 4 hours except that 1.00 part by weight of block calcite-type synthetic calcium carbonate particles having an average particle diameter of 0.80 μm and a particle size distribution $d_{25}/d_{75}$ of 1.51 were added to the reaction product, thereby obtaining a polyester ($a_2'$) having an intrinsic viscosity of 0.60, and containing calcium carbonate particles of an average particle diameter $d_c$ of 0.80 μm. When the polyester ($a_2'$) was heat-treated, the ratio of the average particle diameters of the particles before and after heat-treatment was 0.99. It was thus confirmed that the polyester ($a_2'$) had a high anti-aggregative thermal stability.

In addition, the same ester exchange reaction and polycondensation as in the production of the polyester ($a_1'$) were carried out except that 1.50 parts of delta aluminum oxide particles having an average particle diameter of 0.03 μm were added in place of the synthetic calcium carbonate particles, thereby obtaining a polyester (A') having an intrinsic viscosity of 0.60.

Further, a polyester (B') having substantially no particles and having an intrinsic viscosity of 0.60 was obtained by the same ester exchange reaction and polycondensation as in the production of the polyester ($a_1'$), except that no synthetic calcium carbonate particles were added.

A material (1) of the layer (A') of a biaxially oriented polyester film was then produced from these polyesters ($a_1'$), ($a_2'$), (A') and (B') which were blended in the weight ratio of 50:2:30:18.

A material (2) of the outer layer of the layer (B) of a biaxially oriented polyester film was also produced from these polyesters ($a_1'$) and (B') which were blended in the weight ratio of 23:77.

The polyester (B') was used as a material (3) of the inner layer of the layer (B). The material polyesters (1), (3) and (2) were preliminarily crystallized separately from each other, and dried by an ordinary method. The material polyesters (1), (3) and (2) were co-extruded from different melt-extruders so that the material (1) was positioned for the layer (A), the material (3) for the inner layer of the layer (B) and the material (2) for the outer layer of the layer (B), thereby obtaining an amorphous sheet of three layers with a thickness ratio: the layer (A)/the inner layer of the layer (B)/the outer layer of the layer (B)=1:13:1.

By utilizing the peripheral speed of multistage nip rolls, the film was stretched to 3.0 times in the machine direction at a film temperature of 112° C. at a first stage, and then continuously stretched to 1.5 times in the transverse direction at a film temperature of 113° C. at a second stage. The birefringence index of the film after it was stretched at the first stage was $1.5 \times 10^{-2}$, and the birefringence index of the film after stretched at the second stage was $3.9 \times 10^{-2}$. After the film obtained was temporarily chilled to 40° C., it was heated to 98° C. and stretched to 1.2 times in the machine direction. The birefringence index of the film stretched in the machine direction was $6.1 \times 10^{-2}$.

This film was then stretched to 3.95 times in the transverse direction at 105° C. by a tenter, and further stretched to 1.05 times in the machine direction at 125° C. The film was thereafter heat-treated at 220° C. to obtain a film of 15 μm in thickness. The Young's modulus of the film obtained was 430 kg/mm2 in the machine direction and 620 kg/mm in the transverse direction. The intrinsic viscosity of the film was 0.59.

A magnetic layer was formed on the surface B of the film to produce a magnetic tape, and the properties thereof were evaluated. The results are shown in Table 3.

Example 4

A film was obtained in the same way as in Example 3 by using the polyesters in Example 3 except that the contents of the particles were as shown in Table 3, and the properties of the film were evaluated. The results are shown in Table 3.

Comparative Example 5

The same polycondensation reaction as in the production of the polyester ($a_1'$) in Example 3 was carried out for 4 hours except for using 1.10 parts of block calcite-type synthetic calcium carbonate particles having an average particle diameter of 0.64 μm and a particle size distribution $d_{25}/d_{75}$ of 1.73, thereby obtaining a polyester ($a_3'$) having an intrinsic viscosity of 0.60, and containing calcium carbonate particles of an average particle diameter $d_a$ of 0.64 μm. When the polyester ($a_3'$) was heat-treated, the value $d_a/d_a'$ (after heat treatment) was 0.98. It was thus confirmed that the polyester ($a_3'$) had a high anti-aggregative thermal stability.

A film was obtained in the same way as in Example 3 by using the polyesters ($a_3'$), (A') and (B') except that the contents of the particles were as shown in Table 4 and the birefringence of the film was 0.005, and the properties of the film were evaluated.

Comparative Example 6

The same polycondensation reaction as in the production of the polyester ($a_1'$) in Example 3 was carried out for 4 hours except for using 2.00 parts of block calcite-type synthetic calcium carbonate particles having an average particle diameter of 0.31 μm and a particle size distribution $d_{25}/d_{75}$ of 2.63, thereby obtaining a polyester (C') having an intrinsic viscosity of 0.62, and containing calcium carbonate particles of an average particle diameter $d_a$ of 0.31 μm. When the polyester (C') was heat-treated, the value $d_a/d_a'$ (after heat treatment) was 0.98. It was thus confirmed that the polyester (C') had a high anti-aggregative thermal stability.

A film was obtained in the same way as in Example 3 by using the polyesters (C'), (A' and (B') except that the contents of the particles were as shown in Table 4 and the birefringence index of the film was 0.029, and the properties of the film were evaluated.

The results are collectively shown in Tables 3 and 4.

TABLE 3

| | Example 3 | Example 4 |
|---|---|---|
| Layer A | | |
| Particles | Calcite calcium carbonate | Calcite calcium carbonate |
| Diameter $d_a$ (μm) | 0.46 | 0.46 |
| Content $w_a^A$ (wt %) | 0.55 | 0.55 |
| ($d_a$ + 0.5 $w_a^A$) | 0.74 | 0.74 |
| Particles | Calcite calcium carbonate | Calcite calcium carbonate |
| diameter $d_c$ (μm) | 0.80 | 0.80 |
| Content (wt %) | 0.02 | 0.02 |
| Content (wt %) of aluminum oxide | 0.45 | 0.45 |
| Inner layer of Layer B | | |
| Particles | — | Calcite calcium carbonate |
| diameter $d_a$ (μm) | — | 0.46 |
| Content $w_a$ (wt %) | 0 | 0.06 |
| Content (%) of aluminum oxide | 0 | 0.03 |
| Outer layer of Layer B | | |
| Particles | Calcite calcium carbonate | Calcite calcium carbonate |
| diameter $d_a$ (μm) | 0.46 | 0.46 |
| Content $w_a$ (wt %) | 0.25 | 0.25 |
| Content (%) of aluminum oxide | 0 | 0 |
| Whole film | | |
| Content (%) of calcite calcium carbonate | 0.053 | 0.105 |
| Content (%) of aluminum oxide | 0.030 | 0.056 |
| Properties | | |
| Thermal stability | A | A |
| Take-up property | very good | Very good |
| Slitterbility | A | A |
| nα | 1.494 | 1.493 |
| Δn | 0.045 | 0.046 |
| $Ra^B$ (μm) | 0.009 | 0.009 |
| $Ra^A$ (μm) | 0.013 | 0.013 |
| $Rz^A/Ra^A$ | 10 | 10 |
| Number of protuberance units (per/mm2) on the surface A | 1420 | 1430 |
| Abrasion resistance on the surface A | A | A |
| Dirt on calender | A | A |
| Cutting property 1 | A | A |
| Cutting property 2 | A | A |
| Signal recording property | A | A |
| Dropout | A | A |
| Wriggling running resistance of the surface A | A | A |
| $\mu d^{50A}/\mu d^{1A}$ of the surface A | 1.3 | 1.3 |
| Scuff resistance of the surface A | 5 | 5 |

TABLE 4

| | Comparative Example 5 | Comparative Example 6 |
|---|---|---|
| Layer A | | |
| Particles | Calcite calcium carbonate | Kaolin |
| Average particle diameter $d_a$ (μm) | 0.64 | 0.31 |
| Content $w_a^A$ (wt %) | 0.70 | 0.60 |
| ($d_a$ + 0.5 $w_a^A$) | 0.99 | 0.61 |
| Content (%) of aluminum oxide | 0.30 | 0.30 |

TABLE 4-continued

| | Comparative Example 5 | Comparative Example 6 |
|---|---|---|
| Layer B | | |
| Particles | Calcite calcium carbonate | Kaolin |
| Average particle diameter $d_a$ (μm) | 0.64 | 0.31 |
| Content $w_a$ (wt %) Whole Layer | 0.12 | 0.60 |
| Content (%) of calcite calcium carbonate | 0.055 | Kaolin 0.080 |
| Content (%) of aluminum oxide | 0.020 | 0.020 |
| Properties | | |
| Thermal stability | B | A |
| Take-up property | Slightly bad | Bad |
| Slitterbility | A | A |
| nα | 1.493 | 1.495 |
| Δn | 0.005 | 0.029 |
| $Ra^B$ (μm) | 0.009 | 0.017 |
| $Ra^A$ (μm) | 0.018 | 0.017 |
| $Rz^A/Ra^A$ | 17 | 16 |
| Number of protuberance units (per/mm²) on the surface A | 1600 | 1490 |
| Abrasion resistance of the surface A | B | B |
| Dirt on calender | B | B to C |
| Cutting property 1 | B | A to B |
| Cutting property 2 | B | A to B |
| Signal recording property | B | B to C |
| Dropout | B | B to C |
| Wriggling running resistance of the surface A | B | B to C |
| $\mu d^{50A}/\mu d^{1A}$ of the surface A | 1.7 | 1.9 |
| Scuff resistance of the surface A | 3 | 3 |

Each of the laminated films in Examples 3 and 4 in accordance with the present invention is excellent in the manufacturing stability due to the high anti-aggregative thermal stability (thermal stability of the materials high enough to prevent aggregation), and is also excellent in the material cost and the slittability. Each film has a uniform surface and excellent running durability, abrasion resistance and scratch resistance, so that it is very useful as a base film of a magnetic recording medium, especially as a base film of a non-back-coat type high-grade video tape.

Example 5

<Surface treatment of particles>

The surfaces of block calcite-type synthetic calcium carbonate particles which had been pulverized in advance were treated with 1.5 wt % (based on the particles) of a copolymer of a polyacrylic acid having a part of the carobxyl group neutralized with ammonia, methoxypolyehtylene glycol and polypropylene glycol monomethacrylate. An ethylene glycol slurry containing the particles was classified and filtered. The concentration of the particles in the slurry was 20 wt %, the average particle diameter of the particles was 0.40 μm and the particle size distribution $d_{25}/d_{75}$ was 1.54.

Thereafter, 1.9 mol % (based on the particles) of an ethylene glycol solution of ethyl acid phosphate (mixture of monoethyl acid phosphate and diethyl acid phosphate in the molar ratio of 1:1) was added to the slurry and the resultant slurry wad stirred for 3 hours at 30° C. by a homomixer, then filtered. The concentration of the particles in the slurry obtained was 18 wt %, the average particle diameter of the particles was 0.42 μm and the particle size distribution $d_{25}/d_{75}$ was 1.55. Monoethyl acid phosphate is a compound represented by the general formula (12) wherein l is 2, m and n are 1 and R is an ethyl group, and diethyl acid phosphate is a compound represented by the general formula (12) wherein l and n are 1, m is 2 and R is an ethyl group.

<Production of polyester>

100 parts of dimethyl terephthalate, 60 parts of ethylene glycol and 0.09 part of magnesium acetate tetrahydrate were charged into a reactor and heated to carry out ester exchange reaction, while raising the temperature and distilling off methanol. The reaction temperature was gradually raised to 230° C. in about 4.5 hours after the start of the reaction, whereby the ester exchange reaction was substantially completed.

Thereafter, 1.80 parts of the slurry containing the surface-treated particles was added to the reaction product in the form of an ethylene glycol slurry.

After the addition of the slurry, 0.04 part of antimony trioxide was added to carry out polycondensation for 4 hours, thereby obtaining a polyester material ($a_1$") having an intrinsic viscosity of 0.61 and a resistivity (ρV) of 5.0× 6Ω·cm), and containing calcium carbonate particles of an average particle diameter $d_a$ of 0.42 μm.

When the polyester ($a_1$") was heat-treated, the value $d_a/d_a'$ (after heat treatment) was 0.90. It was thus confirmed that the polyester ($a_1$") had a high anti-aggregative thermal stability.

<Production of other polyesters>

100 parts of dimethyl terephthalate, 60 parts of ethylene glycol and 0.09 part of magnesium acetate tetrahydrate were charged into a reactor and heated to carry out ester exchange reaction, while raising the temperature and distilling off methanol. The reaction temperature was gradually raised to 230° C. in about 4.5 hours after the start of the reaction, whereby the ester exchange reaction was substantially completed.

2.00 parts of block calcite-type synthetic calcium carbonate particles which had an average particle diameter of 0.80 μm and a particle size distribution $d_{25}/d_{75}$ of 1.51 and which had been pulverized, classified and filtered in advance were added to the reaction product in the form of an ethylene glycol slurry. The surfaces of the particles had been treated in advance with 1.5 wt % (based on the particles) of a copolymer of a polyacrylic acid having a part of the carobxyl group neutralized with ammonia, methoxypolyehtylene glycol and polypropylene glycol monomethacrylate.

Thereafter, 0.04 part of ethyl acid phosphate and 0.04 part of antimony trioxide were added to the reaction mixture to carry out polycondensation for 4 hours, thereby obtaining a polyester material ($a_2$") having an intrinsic viscosity of 0.60, and containing calcium carbonate particles of an average particle diameter $d_c$ of 0.80 μm. When the polyester ($a_2$") was heat-treated, the ratio of the average particle diameters of the particles before and after heat-treatment was 0.99. It was thus confirmed that the polyester ($a_2$") had a high anti-aggregative thermal stability.

Separately from this, the same polycondensation reaction as in the production of the polyester ($a_2$") was carried out for 4 hours except that 1.50 parts of delta aluminum oxide particles having an average particle diameter of 0.03 μm were added in place of the synthetic calcium carbonate particles, thereby obtaining a polyester (b) having an intrinsic viscosity of 0.60.

Further, a polyester (c) having substantially no particles and having an intrinsic viscosity of 0.62 was obtained by the same ester exchange reaction and polycondensation as in the production of the polyester ($a_1"$) except that no synthetic calcium carbonate particles were added.

<Production of polyester film>

A biaxially oriented polyester film was then produced from these polyesters ($a_1"$), ($a_2"$), (b) and (c) which were blended in the weight ratio of 35:2:20:43.

The mixed polyester was dried and melt-extruded at 290° C. and chilled and solidified on a casting drum by an electrostatic pinning method so as to obtain an amorphous sheet.

By utilizing the peripheral speed of multistage nip rolls, the film was stretched to 3.0 times in the machine direction at a film temperature of 112° C. at a first stage and then continuously stretched to 1.5 times in the transverse direction at a film temperature of 113° C. at a second stage. The birefringence index of the film after stretched at the first stage was $1.5 \times 10^{-2}$, and the birefringence index of the film after stretched at the second stage was $3.9 \times 10^{-2}$. After the film obtained was temporarily chilled to $-40°$ C., it was heated to 98° C. and stretched to 1.2 times in the machine direction. The birefringence index of the film stretched in the machine direction was $6.1 \times 10^{-2}$.

This film was then stretched to 3.95 times in the transverse direction by a tenter, and 1.05 times in the machine direction. The film was thereafter heat-treated at 225° C. to obtain a film of 15 μm in thickness.

A magnetic layer was formed on the film to produce a magnetic tape, and the properties thereof were evaluated.

Example 6

The same surface procedure as in the slurry used for the production of the polyester ($a_1"$) in Example 5 was carried out except for using block calcite-type synthetic calcium carbonate particles having an average particle diameter of 0.28 μm and a particle size distribution $d_{25}/d_{75}$ of 1.53 and changing the amount of ethyl acid phosphate used to 2.4 mol % based on the particles.

The same polycondensation reaction as in the production of the polyester ($a_1"$) in Example 5 was carried out for 4 hours by using the slurry containing the surface-treated particles except that the contents of the particles was 1.20 parts, thereby obtaining a polyester ($a_3"$) having an intrinsic viscosity of 0.61 and a resistivity ($\rho V$) of $8 \times 10^6 \Omega \cdot$cm, and containing calcium carbonate particles of an average particle diameter $d_a$ of 0.28 μm. When the polyester ($a_3"$) was heat-treated, the value $d_a/d_a'$ (after heat treatment) was 0.88. It was thus confirmed that the polyester ($a_3"$) had a high anti-aggregative thermal stability.

A film was obtained in the same way as in Example 5 by blending the polyester ($a_3"$) and the polyesters in Example 5 except that the contents of the particles were as shown in Table 5, and the properties of the film were evaluated.

Example 7

The same surface treatment as in the slurry used for the production of the polyester ($a_1"$) in Example 5 was carried out except for using block calcite-type synthetic calcium carbonate particles having an average particle diameter of 0.43 μm and a particle size distribution $d_{25}/d_{75}$ of 1.54.

The same polycondensation reaction as in the production of the polyester ($a_1"$) in Example 5 was carried out for 4 hours by using the slurry containing the surface-treated particles except that the contents of the particles was 2.00 parts, thereby obtaining a polyester ($a_4"$) having an intrinsic viscosity of 0.61 and a resistivity ($\rho V$) of $5.0 \times 10^6 \Omega \cdot$cm, and containing calcium carbonate particles of an average particle diameter $d_a$ of 0.43 μm. When the polyester ($a_4"$) was heat-treated, the value $d_a/d_a'$ (after heat treatment) was 0.88. It was thus confirmed that the polyester ($a_4"$) had a high anti-aggregative thermal stability.

A film was obtained in the same way as in Example 5 by blending the polyester ($a_4"$) and the polyesters in Example 5 except that the contents of the particles were as shown in Table 5, and the properties of the film were evaluated.

Example 8

The same surface treatment as in the slurry used for the production of the polyester ($a_3"$) in Example 6 was carried out except for using 1.9 mol % (based on the particles) of a compound represented by the general formula (12) wherein l and n are 1, m is 2 and R is a —n—$C_8H_{16}$COOH group as a phosphorus compound in place of ethyl acid phosphate.

The same polycondensation reaction as in the production of the polyester ($a_3"$) in Example 6 was carried out for 4 hours by using the slurry containing the surface-treated particles, thereby obtaining a polyester ($a_5$) having an intrinsic viscosity of 0.61 and a resistivity ($\rho V$) of $4.0 \times 10^6 \Omega \cdot$cm, and containing the calcium carbonate particles of an average particle diameter $d_a$ of 0.28 μm. When the polyester ($a_5$) was heat-treated, the value $d_a/d_a'$ (after heat treatment) was 0.62. It was thus confirmed that the polyester ($a_5$) had a high anti-aggregative thermal stability.

A film was obtained in the same way as in Example 5 by blending the polyester ($a_5$) and the polyesters in Example 5 except that the contents of the particles were as shown in Table 5, and the properties of the film were evaluated.

The results are collectively shown in Table 5.

Example 9

The same surface procedure as in the slurry used for the production of the polyester ($a_1"$) in Example 5 was carried out except for using block calcite-type synthetic calcium carbonate particles having an average particle diameter of 0.45 μm and a particle size distribution $d_{25}/d_{75}$ of 1.53.

The same polycondensation reaction as in the production of the polyester ($a_1"$) in Example 5 was carried out for 4 hours, thereby obtaining a polyester ($a_6$) having an intrinsic viscosity of 0.61 and a resistivity ($\rho V$) of $5.2 \times 10^6 \Omega \cdot$cm), and containing calcium carbonate particles of an average particle diameter $d_a$ of 0.45 μm. When the polyester ($a_6$) was heat-treated, the value $d_a/d_a'$ (after heat treatment) was 0.92. It was thus confirmed that the polyester ($a_6$) had a high anti-aggregative thermal stability.

The polyester ($a_6$) and the polyesters in Example 5 were blended in the ratio shown in Table 7, and used as the materials of the layer (A), the intermediate layer, and the layer (B) of a biaxially oriented laminated polyester. The three kinds of material polyesters were preliminarily crystallized separately from each other, and dried by an ordinary method. The material polyesters were then co-extruded from different melt-extruders so that the thickness ratio of the layer (A)/the intermediate layer/the layer (B)=1:13:1, thereby obtaining an amorphous sheet of three composite layers. At this time, the sheet was chilled and solidified on a casting drum by an electrostatic pinning method.

The exposed surface of the layer (A) of the film is assumed to be a surface A and the exposed surface of the layer (B) to be a surface B.

A three-layered polyethylene terephthalate film was obtained by the same film formation as in Example 5, and the properties thereof were evaluated.

Example 10

A film was obtained in the same way as in Example 9 except that the contents of the particles were as shown in Table 7, in other words, the polyester ($a_6$) and the polyester (C) were used for the intermediate layer, and the properties of the film were evaluated.

The results are collectively shown in Table 7.

TABLE 5

| | Example 5 | Example 6 | Example 7 | Example 8 |
|---|---|---|---|---|
| Particle (Before treatment) | Calcite calcium carbonate | Calcite calcium carbonate | Calcite calcium carbonate | Calcite calcium carbonate |
| Average particle diameter (μm) (After treatment) | 0.40 1.54 | 0.28 1.53 | 0.43 1.54 | 0.28 1.53 |
| $d_a$ (μm) | 0.42 | 0.31 | 0.43 | 0.28 |
| $d_{25}/d_{75}$ | 1.55 | 1.55 | 1.55 | 1.53 |
| $C_p$ | 0.42 | 0.71 | 0.43 | 0.04 |
| Thermal stability | A | A | A | B |
| $w_a$ (wt %) | 0.63 | 0.90 | 0.50 | 0.90 |
| $d_a + 0.5 w_a$ | 0.72 | 0.73 | 0.68 | 0.73 |
| Particles | Calcite calcium carbonate | Calcite calcium carbonate | Calcite calcium carbonate | Calcite calcium carbonate |
| $d_{25}/d_{75}$ | 1.51 | 1.51 | 1.51 | 1.51 |
| Average particle diameter $d_c$ (μm) | 0.80 | 0.80 | 0.80 | 0.80 |
| Thermal stability | A | A | A | A |
| $w_a$ (wt %) | | | | |
| Particles | Alumina | Alumina | Alumina | Alumina |
| Average particle diameter $d_b$ (μm) | 0.03 | 0.03 | 0.03 | 0.03 |
| Content $w_b$ (wt %) | 0.30 | 0.30 | 0.30 | 0.30 |
| Winding property | Very good | Very good | Very good | Very good |
| Δn | 0.046 | 0.045 | 0.046 | 0.045 |
| nα | 1.494 | 1.494 | 1.493 | 1.494 |
| [η] | 0.59 | 0.59 | 0.59 | 0.59 |
| $\rho_v$ (Ω · cm) | $2.2 \times 10^7$ | $1.0 \times 10^7$ | $2.4 \times 10^7$ | $0.8 \times 10^7$ |
| E (kg/mm²) | | | | |
| machine | 430 | 425 | 430 | 425 |
| transverse | 620 | 615 | 620 | 615 |
| Ra (μm) | 0.017 | 0.017 | 0.017 | 0.017 |
| Rz/Ra | 11 | 10 | 11 | 12 |
| Number of irregularity units (per mm²) | 1570 | 1340 | 1670 | 1740 |
| Abrasion resistance | A | A | A | A to B |
| Dirt on calender | A | A | A | A to B |
| Cutting property | A | A | A | A |
| $\mu d^{50}/\mu d^1$ | 1.3 | 1.1 | 1.3 | 1.6 |
| Wriggling running resistance | A | A | A | A to B |
| Signal recording property | A | A | A | A to B |
| Dropout | A | A | A | A to B |
| Scratch resistance | 5 | 5 | 5 | 4 |

TABLE 6

| | Example 9 | Example 10 |
|---|---|---|
| Layer A | | |
| Particles Before treatment | Calcite calcium carbonate | Calcite calcium carbonate |
| Average particle diameter (μm) After treatment | 0.45 | 0.45 |
| $d_a$ (μm) | 0.45 | 0.45 |
| Thermal stability | A | A |
| $w_a$ (wt %) | 0.60 | 0.60 |
| $(d_a + 0.5 w_a{}^A)$ | 0.75 | 0.75 |
| Other particles | | |
| Particles | Calcite calcium carbonate | Calcite calcium carbonate |
| Average particle diameter $d_c$ (μm) | 0.80 | 0.80 |
| Content (wt %) | 0.04 | 0.04 |
| Other particles | | |
| Particles | Aluminum oxide | Aluminum oxide |
| Average particle diameter (μm) | 0.03 | 0.03 |
| Content (wt %) | 0.45 | 0.45 |
| Inner layer | | |
| Particles | — | Calcite calcium carbonate |
| Average particle diameter $d_a$ (μm) | — | 0.45 |
| Content (wt %) | 0 | 0.05 |
| Layer B | | |
| Particles | Calcite calcium carbonate | Calcite calcium carbonate |
| Before treatment | | |
| Average particle diameter (μm) After treatment | 0.45 | 0.45 |
| $d_a$ (μm) | 0.45 | 0.45 |
| Thermal stability | A | A |
| $w_a$ (wt %) | 0.25 | 0.25 |

TABLE 7

| | Example 9 | Example 10 |
|---|---|---|
| Winding property | Very good | Very good |
| Δn | 0.046 | 0.046 |
| nα | 1.494 | 1.494 |
| [η] | 0.59 | 0.59 |
| $\rho_v$ (Ω · cm) | $2.2 \times 10^7$ | $1.1 \times 10^7$ |
| E (kg/mm2) | | |
| machine direction | 430 | 430 |
| transverse direction | 620 | 620 |
| Ra (μm) | 0.009 (surface A) | 0.009 (surface A) |
| | 0.017 (surface B) | 0.017 (surface B) |
| $Rz^A/Ra^a$ | 11 (surface A) | 11 (surface A) |
| Number of irregularity units (per/mm²) | 1570 (surface A) | 1570 (surface A) |
| Abrasion resistance | A (surface A) | A (surface A) |
| Dirt on calender | A | A |
| Cutting property | A | A |
| $\mu d^{50A}/\mu d^{1A}$ | 1.1 (surface A) | 1.1 (surface A) |
| Wriggling running resistance | A (surface A) | A (surface A) |

TABLE 7-continued

|  | Example 9 | Example 10 |
|---|---|---|
| Signal recording | A | A |
| Dropout | A | A |
| Scratch resistance | 5 | 5 |
|  | (surface A) | (surface A) |

Each of the films in Examples 5 to 10 in accordance with the present invention is excellent in the manufacturing stability due to the thermal stability of the materials high enough to prevent aggregation. In addition, each film has a uniform surface and excellent running durability, abrasion resistance and scratch resistance.

What is claimed is:

1. A biaxially oriented polyester film for a magnetic recording medium, the polyester film comprising:

(a) synthetic calcium carbonate particles having properties represented by the following formulas (1) to (4) and (13):

$$0.25 \leq d_a \leq 0.75 \quad (1)$$

$$0.35 \leq W_a^A \leq 1.00 \quad (2)$$

$$0.5 \leq d_a + 0.5 W_a^A \leq 0.95 \quad (3)$$

$$8 d_a - W_a^A \geq 1.50 \quad (4)$$

$$d_{25}/d_{75} \leq 1.8 \quad (13)$$

wherein $d_a$ represents an average particle diameter (in μm) of the synthetic calcium carbonate particles in the polyester film, $W_a^A$ represents the content (in wt %) of the synthetic calcium carbonate particles in the polyester film, $d_{25}$ represents the particle diameter at the point of 25% of the total accumulated weight and $d_{75}$ represents the particle diameter at the point of 75% of the total accumulated weight, when the particles are arranged in order of weight, wherein:

said synthetic calcium carbonate particles are a mixture of at least two kinds of synthetic calcium carbonate particles each of which have different average particle diameters, wherein the average particle diameter of the kind of synthetic calcium carbonate particles having an average particle diameter larger than $d_a$ is from $1.5 \times d_a$ to $3.0 \times d_a$, and wherein the content of the kind of synthetic calcium carbonate particles having an average particle diameter larger than $d_a$ is from $0.005 \times W_a^A$ to $0.2 \times W_a^A$, and said synthetic calcium carbonate particles are produced by surface-treating synthetic calcium carbonate particles with a polycarboxylic acid and treating the surface-treated synthetic calcium carbonate particles with a phosphorus compound represented by the following general formula (12):

wherein R represents a hydrocarbon group having from 1 to 10 carbon atoms, l is 1 or 2, m is 1 or 2, n is 1 or 2, and the sum of l and m is 3, wherein the content of said phosphorus compound is from 0.05 to 10.0 mol %, based on said synthetic calcium carbonate particles; and (b) aluminum oxide particles having properties represented by the following formulas (5) and (6):

$$0.005 \leq d_b \leq 0.50 \quad (5)$$

$$0.15 \leq W_b^A \leq 1.00 \quad (6)$$

wherein $d_b$ represents an average particle diameter (in μm) of the aluminum oxide particles in the polyester film, and $W_b^A$ represents the content (in wt %) of the aluminum oxide particles in the polyester film, the polyester film having simultaneously properties represented by the following formulas (7) to (9):

$$0.009 \leq Ra^A \leq 0.020 \quad (7)$$

$$7.0 \leq Rz^A/Ra^A \leq 15 \quad (8)$$

$$0.80 \leq \mu d^{50^A}/\mu d^{1^A} \leq 1.6 \quad (9)$$

wherein $Ra^A$ and $Rz^A$ represent an average center line roughness (μm) of the exposed surface of the polyester film and a surface roughness (μm) at 10 points on the exposed surface of the polyester film, respectively, and $\mu d^{50^A}/\mu d^{1^A}$ represents the ratio of a dynamic friction coefficient of the exposed surface of the polyester film at the fiftieth running to a dynamic friction coefficient of the exposed surface of the polyester film at the first running, when the polyester film is run repeatedly.

2. A biaxially oriented polyester film according to claim 1, wherein a surface of said polyester film has from 1 to 15000 irregularity units per surface area of 1 mm², each of which is composed of a protuberance surrounded by a depression having a major axial diameter of at least 0.2 μm.

3. A biaxially oriented polyester film according to claim 1, wherein the refractive index of said film in the direction of thickness is not less than 1.490, the difference (Δn) between the refractive index ($n_{TD}$) in the transverse direction and the refractive index ($n_{MD}$) in the machine direction of said film is not less than 0.020, the sum of the Young's modulus in the machine direction and the Young's modulus in the transverse direction of said film is not less than 900 kg/mm2, and the difference between the Young's modulus in the transverse direction and the Young's modulus in the machine direction of said film is less than 200 kg/mm2.

4. A multilayer film comprising a polyester film according to claim 1 as polyester layer (A) and a polyester layer (B), wherein said multilayer film has properties represented by the following formulas (10) and (11)

$$W_b \leq 0.10 \quad (10)$$

$$0.002 \leq Ra^B \leq 0.017 \quad (11)$$

wherein $W_b$ represents the content (in wt %) of said aluminum oxide particles in said multilayer film, and $Ra^B$ represents the surface roughness (in μm) of the exposed surface of said polyester layer (B).

5. A multilayer film according to claim 4, wherein the content of synthetic calcium carbonate particles in said polyester layer (B) is $0.1 \times W_a^A$ to $1.0 \times W_a^A$.

6. A multilayer film according to claim 4, wherein the content of said synthetic calcium carbonate particles in said multilayer film is not more than 0.30 wt %.

7. A multilayer film according to claim 4, wherein the content of said aluminum oxide particles in said multilayer film is not more than 0.05 wt %.

8. A multilayer film according to claim 4, wherein the thickness of said polyester layer (A) is 1 to 50% of the total thickness of said multilayer film.

9. A multilayer film according to claim 4, wherein the thickness of said polyester layer (A) is $1.0 \times d_a$ to $20 \times d_a$.

10. A multilayer film according to claim 4, wherein the ratio ($Ra^B/Ra^A$) of the surface roughness ($Ra^B$) of the exposed surface of said polyester layer (B) and the surface roughness ($Ra^A$) of the exposed surface of said polyester layer (A) is 0.1 to 1.0.

11. A biaxially oriented polyester film according to claim 1, wherein said polycarboxylic acid is selected from the group consisting of a polycarboxylic acid, or an alkali salt thereof or an ammonium salt thereof; a copolymer containing a polycarboxylic acid unit, a polyacrylic acid unit, a polycarboxylic acid derivative unit or a polyacrylic acid derivative unit; and a copolymer containing a polyalkylene glycol unit and a polyacrylic acid unit, a polyacrylic acid derivative unit, a polycarboxylic acid unit or a polyacrylic acid derivative unit.

12. A biaxially oriented polyester film according to claim 1, wherein the content of said polycarboxylic acid is from 0.10 to 10 wt %, based on said synthetic calcium carbonate particles.

13. A biaxially oriented polyester film according to claim 1, wherein said phosphorus compound is selected from the group consisting of monoethyl acid phosphate, diethyl acid phosphate, monomethyl acid phosphate, dimethyl acid phosphate, monopropyl acid phosphate, dipropyl acid phosphate and mixtures thereof.

14. A magnetic recording medium containing a polyester film according to claim 1 and a magnetic layer.

* * * * *